US00RE47489E

(19) United States
(12) Reissued Patent
Uemura

(10) Patent Number: US RE47,489 E
(45) Date of Reissued Patent: Jul. 2, 2019

(54) MOBILE COMMUNICATION SYSTEM, MOBILE STATION APPARATUS, BASE STATION APPARATUS AND RANDOM ACCESS CHANNEL TRANSMITTING METHOD

(71) Applicant: SHARP KABUSHIKI KAISHA, Osaka-shi, Osaka (JP)

(72) Inventor: Katsunari Uemura, Chiba (JP)

(73) Assignee: SHARP KABUSHIKI KAISHA, Sakai, Osaka (JP)

(21) Appl. No.: 14/472,097

(22) Filed: Aug. 28, 2014

Related U.S. Patent Documents

Reissue of:
(64) Patent No.: 8,503,413
Issued: Aug. 6, 2013
Appl. No.: 12/439,474
PCT Filed: Aug. 20, 2007
PCT No.: PCT/JP2007/066093
§ 371 (c)(1),
(2) Date: Nov. 17, 2009
PCT Pub. No.: WO2008/026461
PCT Pub. Date: Mar. 6, 2008

(30) Foreign Application Priority Data

Aug. 29, 2006 (JP) ..... 2006-232464

(51) Int. Cl.
*H04W 74/08* (2009.01)

(52) U.S. Cl.
CPC ..... *H04W 74/0866* (2013.01)

(58) Field of Classification Search
CPC . H04W 24/02; H04W 24/10; H04W 74/0866; H04W 28/04; H04W 48/16;
(Continued)

(56) References Cited

U.S. PATENT DOCUMENTS 5,657,323 A * 8/1997 Jan et al. ..... 370/252
5,893,036 A * 4/1999 Trandai ..... H04W 52/50 455/522

(Continued)

FOREIGN PATENT DOCUMENTS

CN 1708923 A 12/2005
CN 1708923 A 12/2005

(Continued)

OTHER PUBLICATIONS

3GPP TR (Technical Report) 25.814, V1.5.0(2006-5) Physical Layer Aspects for Evolved UTRA. http://www.3gpp.org/ftp/Specs/html-info/25814.htm, pp. 20-22, 46-47.

(Continued)

*Primary Examiner* — Charles R Craver
(74) *Attorney, Agent, or Firm* — Birch, Stewart, Kolasch & Birch, LLP

(57) ABSTRACT

To improve the delivery probability of a random access channel and increase the information amount notified on the random access channel. In a mobile communication system in which a mobile station apparatus and base station apparatus perform multicarrier communication with each other, the mobile station apparatus sets transmission control information about a random access channel based on a state of the mobile station apparatus in transmitting the random access channel, and the base station apparatus determines the state of the mobile station apparatus based on the transmission control information notified on the random access channel, and performs optimal scheduling corresponding to the state of the mobile station apparatus.

10 Claims, 17 Drawing Sheets

| DOWNLINK CQI | FREQUENCY REGION (n=16) | | | | |
|---|---|---|---|---|---|
| | INITIAL TRANSMISSION | RESOURCE REQUEST | HANDOVER | INTERMITTENT TRANSMISSION | SYNCHRONIZATION CONFIRMATION |
| VERY HIGH | F1 | - | - | - | - |
| HIGH | F2 | F6 | F9 | F12 | F15 |
| MEDIUM | F3 | F7 | F10 | F13 | - |
| LOW | F4 | F8 | F11 | F14 | F16 |
| VERY LOW | F5 | - | - | - | - |

(58) Field of Classification Search

CPC ..... H04W 76/00; H04W 72/08; H04W 72/04; H04W 72/12; H04L 12/2623; H04B 17/318; H04B 17/309

USPC .... 370/338, 331, 332, 230, 232, 235, 236.1, 370/236.2, 278, 329; 455/15, 22, 42, 455/435.2, 437, 439, 444, 456.5, 517, 455/524, 525, 69, 9

See application file for complete search history.

(56) References Cited

U.S. PATENT DOCUMENTS

| | | | | |
|---|---|---|---|---|
| 6,289,003 | B1 * | 9/2001 | Raitola et al. | 370/278 |
| 6,351,459 | B1 | 2/2002 | Kondo | |
| 7,164,660 | B2 | 1/2007 | Baker et al. | |
| 8,285,319 | B2 * | 10/2012 | Shin | H04W 52/08 455/522 |
| 8,295,248 | B2 * | 10/2012 | Kuchibhotla | H04W 72/1231 370/332 |
| 8,509,076 | B2 * | 8/2013 | Reznik | H04L 1/0025 370/235 |
| 9,055,460 | B1 * | 6/2015 | Kim | H04W 52/244 |
| 2005/0018784 | A1 * | 1/2005 | Kurobe et al. | 375/260 |
| 2005/0111406 | A1 * | 5/2005 | Pasanen et al. | 370/329 |
| 2005/0213674 | A1 | 9/2005 | Kobayashi | |
| 2005/0286409 | A1 | 12/2005 | Yoon et al. | |
| 2006/0120302 | A1 * | 6/2006 | Poncini et al. | 370/254 |
| 2007/0010247 | A1 * | 1/2007 | Mouna-Kingue | H04W 74/004 455/434 |
| 2007/0230600 | A1 * | 10/2007 | Bertrand et al. | 375/260 |
| 2008/0095185 | A1 * | 4/2008 | DiGirolamo | H04L 1/0026 370/464 |
| 2009/0296852 | A1 | 12/2009 | Kobayashi | |
| 2010/0214966 | A1 * | 8/2010 | Hu et al. | 370/311 |
| 2013/0265866 | A1 * | 10/2013 | Yi | H04W 74/0841 370/216 |

FOREIGN PATENT DOCUMENTS

| | | | |
|---|---|---|---|
| EP | 1505847 | A1 | 2/2005 |
| JP | 11-164367 | A | 6/1999 |
| JP | 11-164367 | A | 6/1999 |
| JP | 2001-204086 | A | 7/2001 |
| JP | 2001-204086 | A | 7/2001 |
| JP | 2004-215104 | A | 7/2004 |
| JP | 2004215104 | A | 7/2004 |
| JP | 2005-286446 | A | 10/2005 |
| JP | 2005-286446 | A | 10/2005 |
| JP | 2007-227996 | A | 9/2007 |
| JP | 2007-227996 | A | 9/2007 |
| WO | WO 2004/042954 | A1 | 5/2004 |
| WO | WO2004/042954 | A1 | 5/2004 |
| WO | WO 2005/122616 | A1 | 12/2005 |
| WO | WO2005/122616 | A1 | 12/2005 |
| WO | WO 2007/091675 | A1 | 8/2007 |
| WO | WO-2007/091675 | A1 | 8/2007 |
| WO | WO 2007/126793 | A2 | 11/2007 |
| WO | WO 2007/126793 | A2 | 11/2007 |

OTHER PUBLICATIONS

Extended European Search Report in European Application No. 07792707.7 dated Jun. 24, 2011.

U.S. Advisory Action issued in U.S. Appl. No. 12/439,474 dated Jul. 19, 2012.

U.S. Final Office Action issued in U.S. Appl. No. 12/439,474 dated Apr. 5, 2012.

U.S. Notice of Allowance issued in U.S. Appl. No. 12/439,474 dated Sep. 17, 2012.

U.S. Office Action issued in U.S. Appl. No. 12/439,474 dated Sep. 7, 2011.

U.S. Supplemental Notice of Allowance issued in U.S. Appl. No. 12/439,474 dated Jul. 8, 2013.

U.S. Supplemental Notice of Allowance issued in U.S. Appl. No. 12/439,474 dated Nov. 13, 2012.

U.S. Supplemental Notice of Allowance issued in U.S. Appl. No. 12/439,474 dated Oct. 29, 2012.

Motorola, "Non-Synchronized Random Access Message Content," 3GPP TSG RAN WG 2 #54, R2-062476, Tallinn, Estonia, Aug. 23, 2006, 3 pgs.

Philips, "Quantized CQI for Contention Avoidance," 3GPP TSG-RAN WG2 Meeting #54, R2-062310, Tallinn, Estonia, Aug. 23, 2006, 3 pgs.

LG Electronics, Uplink resource request for uplink scheduling, 3GPP TSG Ran WG1 #44 bis, R1-060922, 3GPP, Mar. 27, 2006, pp. 1-4.

NTT DoCoMo, Fujitsu, Mitsubishi Electric, NEC, Sharp, Toshiba Corporation, 3GPP TSG RAN WG1 Meeting #45, Random Access Channel Structure for E-UTRA Uplink, R1-061184, 3GPP, Jun. 8, 2006, pp. 1-13.

CATT, Signalling Information for Node-B Controlled Uplink Scheduling and Text Proposal for TR 25.827, 3GPP TSG RAN WG1#46, R1-062328, 3GPP, Aug. 28, 2006, pp. 1-5.

Nokia, Uplink inter cell interference mitigation and text proposal, 3GPP TSG RAN WG1 #44 Meeting, R1-060298, 3GPP, Feb. 13, 2006, pp. 1-5.

Siemens, Interference Mitigation by Partial Frequency Reuse, TSG-RAN WG1 Meeting #44, R1-060670, 3GPP, Feb. 13, 2006.

Keiji Tachikawa, "W-CDMA mobile communication system", ISBN4-621-04894-5, Initial print on Jun. 25, 2001, Maruzen Co., Ltd, pp. 45-47.

3GPP TR (Technical Report) 25.814, V1.5.0(May 2006) Physical Layer Aspects for Evolved UTRA. http://www.3gpp.org/ftp/Specs/html-info/25814.htm, pp. 20-22, 46-47.

Text Proposal of Prioritizing Non-synchronized Random Access in E-UTRA uplink, 3GPP TSG RAN WG1 Meeting #44 bis, R1-060773, Athens, Greece, Mar. 27-31, 2006.

Text Proposal of Prioritizing Non-synchronized Random Access in E-UTRA uplink, 3GPP TSG RAN WG1 Meeting #44-bis, R1-060786, Athens, Greece, Mar. 27-31, 2006.

3GPP TSG RAN WG1 LTE Ad Hoc, Huawei, "Non-synchronized Random Access Procedure," Cannes, France, Jun. 27-30, 2006, R1-061856.

Extended European Search Report in European Application No. 07792707.7 mailed Jun. 24, 2011.

Qualcomm Europe, "Access Procedures", 3GPP TSG-RAN WG2 R2-060996, 3GPP, Mar. 27-31, 2006, pp. 1-3.

* cited by examiner

| DOWNLINK CQI | FREQUENCY REGION (n=8) |
|---|---|
| VERY HIGH | F1 |
| HIGH | F2, F3 |
| MEDIUM | F4, F5 |
| LOW | F6, F7 |
| VERY LOW | F8 |

FIG. 4

| RACH TRANSMISSION REASON | FREQUENCY REGION (n=8) |
|---|---|
| INITIAL TRANSMISSION | F1 |
| RESOURCE REQUEST | F2, F3 |
| HANDOVER | F4, F5 |
| INTERMITTENT TRANSMISSION | F6, F7 |
| SYNCHRONIZATION CONFIRMATION | F8 |

FIG. 5

| DOWNLINK CQI | FREQUENCY REGION (n=16) | | | | |
|---|---|---|---|---|---|
| | INITIAL TRANSMISSION | RESOURCE REQUEST | HANDOVER | INTERMITTENT TRANSMISSION | SYNCHRONIZATION CONFIRMATION |
| VERY HIGH | F1 | - | - | - | - |
| HIGH | F2 | F6 | F9 | F12 | F15 |
| MEDIUM | F3 | F7 | F10 | F13 | - |
| LOW | F4 | F8 | F11 | F14 | F16 |
| VERY LOW | F5 | - | - | - | - |

FIG. 6

| DOWNLINK CQI | FREQUENCY REGION (n=8) | SIGNATURE NUMBER | | | | |
|---|---|---|---|---|---|---|
| | | INITIAL TRANSMISSION | RESOURCE REQUEST | HANDOVER | INTERMITTENT TRANSMISSION | SYNCHRONIZATION CONFIRMATION |
| VERY HIGH | F1 | 1～10 | 11～15 | 16～20 | 21～26 | 27～32 |
| HIGH | F2, F3 | | | | | |
| MEDIUM | F4, F5 | | | | | |
| LOW | F6, F7 | | | | | |
| VERY LOW | F8 | | | | | |

FIG. 7

| DOWNLINK CQI | SIGNATURE NUMBER | FREQUENCY REGION (n=8) | | | | |
|---|---|---|---|---|---|---|
| | | INITIAL TRANSMISSION | RESOURCE REQUEST | HANDOVER | INTERMITTENT TRANSMISSION | SYNCHRONIZATION CONFIRMATION |
| VERY HIGH | 1～5 | F1, F2 | F3, F4 | F5, F6 | F7 | F8 |
| HIGH | 6～12 | | | | | |
| MEDIUM | 13～20 | | | | | |
| LOW | 21～27 | | | | | |
| VERY LOW | 28～32 | | | | | |

FIG. 8

| DOWNLINK CQI | FREQUENCY REGION (n=6) | TRANSMISSION POWER (n=6) |
|---|---|---|
| VERY HIGH | F1～F6 | P1 > P ≧ P2 |
| HIGH | | P2 > P ≧ P3 |
| MEDIUM | | P3 > P ≧ P4 |
| LOW | | P4 > P ≧ P5 |
| VERY LOW | | P5 > P ≧ P6 |

FIG. 14

| DOWNLINK CQI | FREQUENCY REGION (n=6) | TRANSMISSION POWER (n=6) |
|---|---|---|
| VERY HIGH | F1～F6 | P1 |
| HIGH | | P2 |
| MEDIUM | | P3 |
| LOW | | P4 |
| VERY LOW | | P5 |

FIG. 15

| DOWNLINK CQI | FREQUENCY REGION (n=6) | TRANSMISSION POWER (n=6) | SIGNATURE NUMBER | | | | |
|---|---|---|---|---|---|---|---|
| | | | INITIAL TRANSMISSION | RESOURCE REQUEST | HANDOVER | INTERMITTENT TRANSMISSION | SYNCHRONIZATION CONFIRMATION |
| VERY HIGH | F1～F6 | P1 > P ≧ P2 | 1～10 | 11～15 | 16～20 | 21～26 | 27～32 |
| HIGH | | P2 > P ≧ P3 | | | | | |
| MEDIUM | | P3 > P ≧ P4 | | | | | |
| LOW | | P4 > P ≧ P5 | | | | | |
| VERY LOW | | P5 > P ≧ P6 | | | | | |

FIG. 16

| DOWNLINK CQI | SIGNATURE NUMBER | | |
|---|---|---|---|
| | INITIAL TRANSMISSION TIME | RESOURCE TIME | HANDOVER |
| VERY HIGH | 1, 2 | - | - |
| HIGH | 3, 4, 5 | 17, 18 | 25, 26 |
| MEDIUM | 6, 7, 8, 9, 10 | 19, 20, 21 | 27, 28, 29 |
| LOW | 11, 12, 13 | 22, 23, 24 | 30, 31, 32 |
| VERY LOW | 14, 15, 16 | - | - |

MOBILE COMMUNICATION SYSTEM, MOBILE STATION APPARATUS, BASE STATION APPARATUS AND RANDOM ACCESS CHANNEL TRANSMITTING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 8,503,413 issued on Aug. 6, 2013. The present application also claims priority benefits of PCT/JP2007/066093, filed Aug. 20, 2007, and Japanese Patent Application No. 2006-232464, filed on Aug. 29, 2006. The entirety of each of the above-identified documents is hereby incorporated by reference.*

TECHNICAL FIELD

The present invention relates to a mobile communication system, mobile station apparatus, base station apparatus and random access channel transmitting method using a cellular wireless system.

BACKGROUND ART

Currently, as RAT that is Radio Access Technology, W-CDMA (Wideband-Code Division Multiple Access) specified in 3GPP (3rd Generation Partnership Project) is standardized as the 3rd generation cellular mobile communication system, and its services have been started sequentially (for example, see Non-patent Document 1).

Further, evolution has been studied in 3rd Generation RAT (Evolved Universal Terrestrial Radio Access, hereinafter referred to as "EUTRA") and 3rd Generation RAT access network (Evolved Universal Terrestrial Radio Access Network, hereinafter referred to as "EUTRAN"). In EUTRA, as a communication system, an OFDMA (Orthogonal Frequency Division Multiplexing Access) system has been proposed (for example, see Non-patent Document 2).

In cellular mobile communication system, a mobile station, which is not assigned radio resources for a reason such as a state immediately after turn-on and the like, performs uplink transmission to a base station using the Random Access Channel (hereinafter, referred to as "RACH" as appropriate). Since the RACH is transmitted using radio resources that can be shared by mobile stations, it is considered that the RACH collides with another mobile station depending on the transmission timing. Therefore, mutually orthogonal data sequences are prepared, the orthogonal data sequence is transmitted on the RACH, and the base station is thereby capable of dividing received signals even with the same transmission timing when the signals are different data signal sequences. Such an orthogonal data sequence is called the signature, and a signal formed of the signature is called the RACH Preamble, and is used by a base station to identify a mobile station.

However, a collision occurs in the case that a plurality of mobile station selects the same RACH preamble at the same transmission timing, and in this case, retransmission processing is performed.

Uplink random access procedures in the W-CDMA system will be described briefly with reference to FIG. 17. FIG. 17 is a flowchart to explain transmission procedures of uplink random access channel in the W-CDMA system.

As shown in FIG. 17, a mobile station first calculates initial transmission power of the RACH preamble (step (hereafter, abbreviated as "ST") 11). The initial transmission power is calculated in the mobile station from a measurement result of an intercell interference amount, downlink common pilot channel or the like. Next, the mobile station selects transmission timing of the RACH preamble (ST12), and subsequently, randomly selects one from among a plurality of signatures to generate the RACH preamble (ST13). Then, the mobile station transmits the RACH preamble with the initial transmission power at the transmission timing to a base station (ST14).

After transmitting the RACH preamble, the mobile station determines whether ACK (Acknowledge) indicative of transmission permission is returned from the base station (ST 15). Herein, when ACK is returned, the mobile station starts actual data transmission called the RACH message (ST 16). Meanwhile, when ACK is not returned from the base station, or NACK (Not Acknowledge) is returned, the mobile station checks whether or not the number of retransmissions beforehand defined expires (ST 17). When the number of retransmissions does not expire, the mobile station increases the transmission power (ST 18), newly selects transmission timing for retransmission, and generates the RACH preamble from a randomly selected signature to retransmit (ST 12, ST 13). In the case where the mobile station checks whether or not the number of retransmissions beforehand defined expires at ST 17, while repeating the same processing, and cannot receive ACK from the base retransmissions expires, the mobile station judges as RACH transmission failure (ST 19), and finishes a series of procedures.

In addition, due to differences in wireless system, EUTRA requires control different from the above-mentioned random access procedures in the W-CDMA system. FIG. 18 is a diagram showing an example of channel mapping of RACH proposed in EUTRA. In this example, the RACH uses a region of 1.25 MHz within system frequency bandwidth BW, and further, uses a one-subframe interval TTI (Transmission Timing Interval) in the time domain. In addition, since the RACH is used in a stage that uplink synchronization has not been acquired, guard time is required prior and subsequent to actual RACH transmission for the purpose of preventing interference of transmission data due to propagation delay.

In EUTRA, it is studied that the random access channel is used for the purposes of a mobile station registering the position, notifying handover to a base station that is a handover destination, requesting radio resources, transmitting data in intermittent transmission, maintaining uplink radio synchronization, and the like.

In EUTRA, due to the relationship of the TTI length of the RACH and transmission bandwidth, it is anticipated that the number of data bits that can be contained in the RACH is lower than that in the W-CDMA system. Therefore, a method is required for implicitly notifying information without using data that is actually transmitted. Non-patent Document 3 proposes a method of notifying information using a number of a signature that is a data sequence included in the RACH preamble. Herein, this method is explained with reference to FIG. 19.

FIG. 19 shows an example in which there are 32 data sequences usable as the RACH preamble, and numbers of signatures to use are classified according to a reason of RACH transmission and quality information indicator (Channel Quality Indicator (hereinafter, referred to as "CQI")) at the transmission. For example, when the RACH is transmitted at initial transmission, and the CQI of the mobile station at the transmission is classified as "High", the mobile station selects one from among signature numbers 3 to 5 as shown in FIG. 19, and transmits the RACH preamble. By using this method, without being included in actual transmission data, the base station is capable of grasping the reason of RACH transmission and CQI of the mobile station from the received signature number.

Further, in EUTRA, technique called interference coordination is proposed to reduce an uplink intercell interference amount (for example, see Non-patent Document 2). A plurality of methods is proposed as the interference coordination, and as a predominant method, such a method is proposed that the frequency domain usable in the system is divided into some regions, mobile stations are divided into a plurality of groups based on the transmission power, downlink reception quality (path-loss, or CQI) and the like, each group is associated with the divided frequency region, and that the mobile stations perform transmission only in the associated frequency regions (for example, see Non-patent Document 4). Non-patent Document 4 introduces a method of setting higher target quality of base-station received power in the associated frequency region as the mobile station comes closer to the base station, and thereby improving throughput of transmission data without increasing the uplink intercell interference amount. Herein, this method is explained with reference to FIGS. 20 and 21.

FIG. 20 is a diagram showing that mobile stations UE_A and UE_B are located in cells A to C. Herein, it is assumed that UE_A and UE_B communicate with the cell A. At this point, since UE_A is located near the center (base station) of the cell A, it is considered that downlink reception quality of UE_A is good, and that at the same time, the uplink intercell interference amount hardly exists to peripheral cells (cell B and cell C). Meanwhile, since UE_B is located in the cell edge of the cell A, it is considered that the downlink reception quality is poor, and that at the same time, the uplink intercell interference amount is large to the peripheral cells (cell B and cell C). Therefore, UE_B needs to set the target quality low to reduce the uplink intercell interference amount to the peripheral cells. Meanwhile, UE_A provides few uplink intercell interference amount to the peripheral cells, and is better to set the target quality high to improve uplink throughput.

FIG. 21 is a diagram showing an example for setting different target quality for each frequency region. In FIG. 21, the frequency range of the system is divided into four regions of from RU_BW1 to RU_BW4. Further, mobile stations in the cell are grouped to four stages according to the reception quality, and are assigned the regions starting with RU_BW1 for an excellent quality group. In other words, mobile stations belonging to the poorest quality group use RU_BW4. The target quality of mobile stations belonging to RU_BW4 is Target A, and the target quality is set higher by STEP_n that is a predetermined step width as the quality of the group increases. By this method, it is possible to improve uplink throughput without increasing the uplink intercell interference amount to peripheral cells.

In addition, as the target quality, assumed is SIR (Signal-to-Interference Ratio), SINR (Signal-to-Interference plus Noise Ration), SNR (Signal-to-Noise Ratio), path-loss or the like.

Non-patent Document 1: Keiji Tachikawa, "W-CDMA mobile communication system", ISBN4-621-04894-5, Initial print on Jun. 25, 2001, Maruzen Co., Ltd Non-patent Document 2: 3GPP TR(Technical Report) 25.814, V1.5.0 (2006-5), Physical Layer Aspects for Evolved UTRA. http://www.3gpp.org/ftp/Specs/html-info/25814.htm Non-patent Document 3: NTT DoCoMo. et al, "Random Access Channel Structure for E-UTRA Uplink", 3GPP TSG RAN WG1 Meeting #45, Shanghai, China, 8-12 May, 2006, R1-061184

Non-patent Document 4: Nokia, "Uplink inter cell interference mitigation and text proposal", 3GPP TSG RAN WG1 Meeting #44, Denver, USA, 13-17 Feb., 2006, R1-060298

DISCLOSURE OF INVENTION

Problems to be Solved by the Invention

However, in the method of implicitly notifying information with a signature number as shown in FIG. 19, when the reason of RACH transmission is the same and there is a plurality of mobile stations having almost the same reception quality state, since the number of selectable signatures is limited more s ignificantly than normal, there is the problem that the collision probability of RACH preambles is high.

Meanwhile, in the interference coordination method as shown in FIG. 21, since any consideration is not given to RACH transmission, mobile stations transmit the RACH with initial transmission power corresponding to the reception quality in any frequency regions at the time of RACH transmission. As a result, even a mobile station near the cell center cannot transmit the RACH with high transmission power, and there is the problem that the delivery probability cannot be improved.

The present invention was carried out in view of such problems, and it is an object of the invention to provide a mobile communication system, mobile station apparatus, base station apparatus and random access channel transmitting method for improving the delivery probability of a random access channel without increasing the uplink intercell interference amount, while increasing the information amount notified on the random access channel.

Means for Solving the Problem (1) To attain the above-mentioned object, the present invention took measures as described below. In other words, a mobile communication system according to the invention is a mobile communication system in which a mobile station apparatus and base station apparatus perform communication with each other, and is characterized in that the mobile station apparatus sets transmission control information about a random access channel based on a state of the mobile station apparatus at the time of transmitting the random access channel, and that the base station apparatus determines the state of the mobile station apparatus based on the transmission control information notified on the random access channel, and performs scheduling corresponding to the state of the mobile station apparatus.

Thus, the mobile station apparatus sets transmission control information of a random access channel based on a state of the mobile station apparatus, while the base station apparatus performs scheduling corresponding to the state of the mobile station apparatus based on the transmission control information. According to this means, by setting the transmission control information of the random access channel based on, for example, as a state of the mobile station, quality information indicator at the time the random access channel is transmitted, while further setting, as the transmission control information of the random access channel, transmission power for not increasing interference to peripheral cells, it is possible to enhance the reception quality of the random access channel in the base station apparatus, and therefore, it is possible to improve the delivery probability of the random access channel without increasing the uplink intercell interference amount. Further, for example, by implicitly notifying the quality information indicator using the transmission frequency region of the random access channel, it is possible to increase the information amount notified on the random access channel.

(2) Further, in the mobile communication system according to the invention, the mobile station apparatus is characterized by setting the transmission control information based on at least one information of a measured quality information indicator and a transmission reason of the random access channel as the state of the mobile station apparatus.

Thus, the mobile station apparatus sets the transmission control information based on at least one information of a measured quality information indicator and a transmission reason of the random access channel, and is thereby capable of setting the transmission control information in response to the state of the mobile station apparatus in transmitting the random access channel.

(3) Furthermore, in the mobile communication system of the invention, the mobile station apparatus is characterized by setting one of a transmission frequency region, transmission power and a signature of the random access channel or a combination thereof as the transmission control information.

Thus, as the transmission control information, the mobile station apparatus sets one of a transmission frequency region, transmission power and a signature of the random access channel or a combination thereof, and it is thereby possible to make the base station apparatus grasp various states of the mobile station apparatus using one of the transmission frequency region, transmission power and the signature of the random access channel or a combination thereof.

(4) Still furthermore, in the mobile communication system of the invention, it is a feature that the transmission frequency region is obtained by dividing a transmission bandwidth of the base station apparatus into a plurality of regions corresponding to the reception quality of the mobile station apparatus, and that different transmission power is set for each transmission frequency region.

Thus, since the transmission bandwidth of the base station apparatus is divided into a plurality of regions corresponding to the reception quality of the mobile station apparatus, and different transmission power is set for each transmission frequency region, it is possible to enhance the reception quality of the random access channel in the base station apparatus. By this means, it is possible to enhance the delivery probability of the random access channel without increasing the uplink intercell interference amount.

(5) Further, in the mobile communication system of the invention, the mobile station apparatus is characterized by setting, as the transmission control information, the transmission frequency region corresponding to the quality information indicator and the transmission power corresponding to the transmission frequency region, and transmitting the random access channel using the transmission control information.

Thus, the mobile station apparatus sets the transmission frequency region corresponding to the quality information indicator and the transmission power corresponding to the transmission frequency region as the transmission control information, and transmits the random access channel using the transmission control information, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region corresponding to the quality information indicator, and is thereby capable of implicitly notifying the base station apparatus of the quality information indicator in transmitting the random access channel through the transmission frequency region, and therefore, it is possible to increase the information amount notified on the random access channel.

(6) Furthermore, in the mobile communication system of the invention, the mobile station apparatus is characterized by setting, as the transmission control information, the transmission frequency region corresponding to a combination of the quality information indicator and a transmission reason, and the transmission power corresponding to the transmission frequency region, and transmitting the random access channel using the transmission control information.

Thus, since the mobile station apparatus sets, as the transmission control information, the transmission frequency region corresponding to a combination of the quality information indicator and transmission reason, and the transmission power corresponding to the transmission frequency region, and transmits the random access channel using the transmission control information, it is possible to enhance the reception quality of the random access channel in the base station apparatus. By this means, it is possible to improve the delivery probability of the random access channel without increasing the uplink intercell interference amount.

Further, the mobile station apparatus sets the transmission frequency region corresponding to a combination of the quality information indicator and transmission reason, and is thereby capable of implicitly notifying the base station apparatus of the quality information indicator in transmitting the random access channel and the transmission reason of the random access channel through the transmission frequency region, and therefore, it is possible to increase the information amount notified on the random access channel.

(7) Moreover, in the mobile communication system of the invention, the mobile station apparatus is characterized by setting, as the transmission control information, the transmission frequency region corresponding to the quality information indicator, the transmission power corresponding to the transmission frequency region, and the signature corresponding to the transmission reason, and transmitting the random access channel using the transmission control information.

Thus, the mobile station apparatus sets, as the transmission control information, the transmission frequency region corresponding to the quality information indicator, the transmission power corresponding to the transmission frequency region, and the signature corresponding to the transmission reason, and transmits the random access channel using the transmission control information, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region corresponding to the quality information indicator, while further setting the signature corresponding to the transmission reason, and is thereby capable of implicitly notifying the base station apparatus of the quality information indicator in transmitting the random access channel through the transmission frequency region, and implicitly notifying the base station apparatus of the transmission reason of the random access channel through the signature, and therefore, it is possible to increase the information amount notified on the random access channel.

(8) Further, in the mobile communication system, the mobile station apparatus is characterized by sequentially repeating retransmission procedures in the transmission frequency region corresponding to the quality information indicator lower than a measurement value, in retransmitting the random access channel.

Thus, in retransmitting the random access channel, since retransmission procedures are sequentially repeated in the transmission frequency region corresponding to the quality information indicator lower than a measurement value, even when the random access channel cannot be transmitted with the measurement value, it is possible to vary the transmission frequency region as appropriate, and to retransmit the random access channel in an environment for more facilitating transmission.

(9) Furthermore, in the mobile communication system of the invention, the mobile station apparatus is characterized by setting, as the transmission control information, the signature corresponding to the quality information indicator, the transmission frequency region corresponding to the transmission reason, and the transmission power corresponding to the transmission frequency region, and transmitting the random access channel using the transmission control information.

Thus, the mobile station apparatus sets, as the transmission control information, the signature corresponding to the quality information indicator, the transmission frequency region corresponding to the transmission reason, and the transmission power corresponding to the transmission frequency region, and transmits the random access channel using the transmission control information, and it is thereby possible to enhance the reception quality of the random access channel in the base station apparatus. By this means, it is possible to improve the delivery probability of the random access channel without increasing the uplink intercell interference amount.

Further, the mobile station apparatus sets the signature corresponding to the quality information indicator, while further setting the transmission frequency region corresponding to the transmission reason, and is thereby capable of implicitly notifying the base station apparatus of the quality information indicator in transmitting the random access channel through the signature, and implicitly notifying the base station apparatus of the transmission reason of the random access channel through the transmission frequency region, and therefore, it is possible to increase the information amount notified on the random access channel.

(10) Moreover, in the mobile communication system of the invention, the mobile station apparatus is characterized by setting, as the transmission control information, the transmission frequency region corresponding to the transmission reason and the transmission power corresponding to the transmission frequency region, and transmitting the random access channel using the transmission control information.

Thus, the mobile station apparatus sets the transmission frequency region corresponding to the transmission reason and the transmission power corresponding to the transmission frequency region as the transmission control information, and transmits the random access channel using the transmission control information, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region corresponding to the transmission reason, and is thereby capable of implicitly notifying the base station apparatus of the transmission reason of the random access channel through the transmission frequency region, and therefore, it is possible to increase the information amount notified on the random access channel.

(11) Further, in the mobile communication system of the invention, it is a feature that the transmission frequency region is obtained by dividing a transmission bandwidth of the base station apparatus into a plurality of regions corresponding to the reception quality of the mobile station apparatus, and that different transmission power is set for each transmission frequency region.

Thus, since different transmission power is set for each transmission frequency region, by selecting a transmission frequency region as the transmission control information, and setting corresponding transmission power in the frequency region, it is possible to implicitly notifying the base station apparatus of the quality information indicator in transmitting the random access channel, for example.

(12) Furthermore, in the mobile communication system of the invention, the mobile station apparatus is characterized by setting, as the transmission control information, the transmission power corresponding to the quality information indicator, and transmitting the random access channel using the transmission control information.

Thus, the mobile station apparatus sets the transmission power corresponding to the quality information indicator, transmits the random access channel using the transmission control information, and is thereby capable of implicitly notifying the base station apparatus of the quality information indicator in transmitting the random access channel. Therefore, it is possible to increase the information amount notified on the random access channel.

(13) Still furthermore, in the mobile communication system of the invention, the mobile station apparatus is characterized by setting, as the transmission control information, the transmission power corresponding to the quality information indicator and the signature corresponding to the transmission reason, and transmitting the random access channel using the transmission control information.

Thus, the mobile station apparatus sets, as the transmission control information, the transmission power corresponding to the quality information indicator and the signature corresponding to the transmission reason, and is thereby capable of implicitly notifying the base station apparatus of the quality information indicator in transmitting the random access channel, and the transmission reason of the random access channel. Therefore, it is possible to increase the information amount notified on the random access channel.

(14) Further, a mobile station apparatus of the invention is a mobile station apparatus that communicates with a base station apparatus, and is characterized by having transmission control information setting device to set transmission control information about a random access channel based on at least one information of a measured quality information indicator and a transmission reason of the random access channel, and transmitting device to transmit the random access channel using the transmission control information, where the transmission control information includes one of a transmission frequency region, transmission power and a signature of the random access channel or a combination thereof.

Thus, the mobile station apparatus sets transmission control information about a random access channel based on at least one information of a measured quality information indicator and a transmission reason of the random access channel, and transmits the random access channel using the transmission control information. Further, the transmission control information includes one of a transmission frequency region, transmission power and signature of the random access channel or a combination thereof. By this means, by setting, as the transmission control information, transmission power for not increasing interference to peripheral cells based on, for example, a quality information indicator at the time the random access channel is transmitted, it is possible to enhance the reception quality of the random access channel in the base station apparatus, and therefore, it is possible to improve the delivery probability of the random access channel without increasing the uplink intercell interference amount. Further, for example, by implicitly notifying the quality information indicator using the transmission frequency region of the random access channel, it is possible to increase the information amount notified on the random access channel.

(15) Furthermore, in the mobile station apparatus of the invention, the transmission control information setting device is characterized by setting, as the transmission control information, the transmission frequency region based on the quality information indicator, and predetermined transmission power corresponding to the transmission frequency region.

Thus, the random access channel is transmitted using the transmission control information on which is set the transmission frequency region based on the quality information indicator and predetermined transmission power corresponding to the transmission frequency region, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region based on the quality information indicator, and is thereby capable of implicitly notifying the base station apparatus of the quality information indicator in transmitting the random access channel through the transmission frequency region, and therefore, it is possible to increase the information amount notified on the random access channel.

(16) Still furthermore, in the mobile station apparatus of the invention, the transmission control information setting device is characterized by setting, as the transmission control information, the transmission frequency region based on a combination of the quality information indicator and the transmission reason, and predetermined transmission power corresponding to the transmission frequency region.

Thus, the random access channel is transmitted using the transmission control information on which is set the transmission frequency region based on a combination of the quality information indicator and the transmission reason, and predetermined transmission power corresponding to the transmission frequency region, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region based on a combination of the quality information indicator and the transmission reason, and is thereby capable of implicitly notifying the base station apparatus of the quality information indicator in transmitting the random access channel and the transmission reason of the random access channel through the transmission frequency region, and therefore, it is possible to increase the information amount notified on the random access channel.

(17) Moreover, in the mobile station apparatus of the invention, the transmission control information setting device is characterized by setting, as the transmission control information, the transmission frequency region based on the quality information indicator, predetermined transmission power corresponding to the transmission frequency region, and the signature based on the transmission reason.

Thus, the random access channel is transmitted using the transmission control information on which are set the transmission frequency region based on the quality information indicator, predetermined transmission power corresponding to the transmission frequency region, and the signature based on the transmission reason, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region based on the quality information indicator, while further setting the signature based on the transmission reason, is thereby capable of implicitly notifying the base station apparatus of the quality information indicator in transmitting the random access channel through the transmission frequency region, and of implicitly notifying the base station apparatus of the transmission reason of the random access channel through the signature, and therefore, it is possible to increase the information amount notified on the random access channel.

(18) Further, in the mobile station apparatus of the invention, the transmission control information setting device is characterized by sequentially repeating retransmission procedures in the transmission frequency region corresponding to the quality information indicator lower than a measurement value, in retransmitting the random access channel.

Thus, in retransmitting the random access channel, since retransmission procedures are sequentially repeated in the transmission frequency region corresponding to the quality information indicator lower than a measurement value, even when the random access channel cannot be transmitted with the measurement value, it is possible to vary the transmission frequency region as appropriate, and to retransmit the random access channel in an environment for more facilitating transmission.

(19) Furthermore, in the mobile station apparatus of the invention, the transmission control information setting device is characterized by setting, as the transmission control information, the signature based on the quality information indicator, the transmission frequency region based on the transmission reason, and the transmission power corresponding to the transmission frequency region.

Thus, the random access channel is transmitted using the transmission control information on which are set the signature bas ed on the quality information indicator, the transmission frequency region based on the transmission reason, and the transmission power corresponding to the transmission frequency region, and it is thereby possible to enhance the reception quality of the random access channel in the base station apparatus. By this means, it is possible to improve the delivery probability of the random access channel without increasing the uplink intercell interference amount.

Further, the mobile station apparatus sets the signature based on the quality information indicator, while further setting the transmission frequency region based on the transmission reason, and is thereby capable of implicitly notifying the base station apparatus of the quality information indicator in transmitting the random access channel through the signature, and implicitly notifying the base station apparatus of the transmission reason of the random access channel through the transmission frequency region, and therefore, it is possible to increase the information amount notified on the random access channel.

(20) Moreover, in the mobile station apparatus of the invention, the transmission control information setting device is characterized by setting, as the transmission control information, the transmission frequency region based on the transmission reason and predetermined transmission power corresponding to the transmission frequency region.

Thus, the random access channel is transmitted using the transmission control information on which set is the transmission frequency region based on the transmission reason and predetermined transmission power corresponding to the transmission frequency region, and it is thereby possible to enhance the reception quality of the random access channel in the base station apparatus. By this means, it is possible to improve the delivery probability of the random access channel without increasing the uplink intercell interference amount.

Further, the mobile station apparatus sets the transmission frequency region based on the transmission reason, and is thereby capable of implicitly notifying the base station apparatus of the transmission reason of the random access channel through the transmission frequency region, and therefore, it is possible to increase the information amount notified on the random access channel.

(21) Further, in the mobile station apparatus of the invention, the transmission control information setting device is characterized by setting, as the transmission control information, predetermined transmission power corresponding to the quality information indicator.

Thus, the random access channel is transmitted using the transmission control information on which is set predetermined transmission power corresponding to the quality information indicator, and it is thereby possible to implicitly notify the base station apparatus of the quality information indicator in transmitting the random access channel. Therefore, it is possible to increase the information amount notified on the random access channel.

(22) Furthermore, in the mobile station apparatus of the invention, the transmission control information setting device is characterized by setting, as the transmission control information, predetermined transmission power corresponding to the quality information indicator, and the signature based on the transmission reason.

Thus, the mobile station apparatus sets predetermined transmission power corresponding to the quality information indicator, and the signature based on the transmission reason, and is thereby capable of implicitly notifying the base station apparatus of the quality information indicator in transmitting the random access channel and the transmission reason of the random access channel. Therefore, it is possible to increase the information amount notified on the random access channel.

(23) Further, a base station apparatus of the invention is a base station apparatus that communicates with a mobile station apparatus, and is characterized by having receiving device to receive a random access channel transmitted from the mobile station apparatus, analysis device to analyze transmission control information notified on the random access channel, and scheduling device to determine the state of the mobile station apparatus from an analysis result of the analysis device, and performing scheduling corresponding to the state of the mobile station apparatus.

Thus, the base station apparatus analyzes the transmission control information notified on the random access channel, performs scheduling corresponding to a state of the mobile station apparatus determined from the analysis result, and is thereby capable of performing optimal scheduling in response to the state of the mobile station apparatus that varies by the minute according to circumstances of a communication channel and the like.

(24) Furthermore, in the base station apparatus of the invention, the scheduling device is characterized by performing scheduling based on a position of the transmission frequency region of the random access channel included in the transmission control information.

Thus, the base station apparatus performs scheduling based on a position of the transmission frequency region of the random access channel included in the transmission control information. Therefore, by the mobile station apparatus suitably setting the position of the transmission frequency region corresponding to the state of the mobile station apparatus, the base station apparatus is capable of performing optimal scheduling in response to the information provided from the mobile station apparatus.

(25) Still furthermore, in the base station apparatus of the invention, the scheduling device is characterized by performing scheduling based on a position of the transmission frequency region and a number of a signature of the random access channel included in the transmission control information.

Thus, the base station apparatus performs scheduling based on a position of the transmission frequency region and a number of a signature of the random access channel included in the transmission control information. Therefore, by the mobile station apparatus suitably setting the position of the transmission frequency region and the number of the signature corresponding to the state of the mobile station apparatus, the base station apparatus is capable of performing optimal scheduling in response to the information provided from the mobile station apparatus.

(26) Moreover, in the base station apparatus of the invention, the scheduling device is characterized by performing scheduling based on reception quality of the random access channel received from the mobile station apparatus.

Thus, the base station apparatus performs scheduling based on the reception quality of the random access channel received from the mobile station apparatus. Therefore, for example, only by the mobile station apparatus transmitting the random access channel with beforehand negotiated transmission power, the base station apparatus is capable of performing optimal scheduling in response to the state of the mobile station apparatus.

(27) Further, in the base station apparatus of the invention, the scheduling device is characterized by performing scheduling based on reception quality of the random access channel received from the mobile station apparatus and a number of a signature of the random access channel included in the transmission control information.

Thus, the base station apparatus performs scheduling based on the reception quality of the random access channel received from the mobile station apparatus, and the number of the signature. Therefore, for example, only by the mobile station apparatus suitably setting the number of the signature corresponding to the state of the mobile station apparatus and transmitting the random access channel with beforehand negotiated transmission power, the base station apparatus is capable of performing optimal scheduling in response to the state of the mobile station apparatus.

(28) Further, a random access channel transmitting method of the invention is a method of transmitting a random access channel from a mobile station apparatus that communicates with a base station apparatus, and is characterized in that the mobile station apparatus determines transmission control information about a random access channel based on a state of the mobile station apparatus at the time of transmitting the random access channel, and that the base station apparatus determines the state of the mobile station apparatus based on the transmission control information notified on the random access channel, and performs scheduling corresponding to the state of the mobile station apparatus.

Thus, the mobile station apparatus sets transmission control information of a random access channel based on a state of the mobile station apparatus, while the base station apparatus performs scheduling corresponding to the state of the mobile station apparatus based on the transmission control information. According to this means, by setting the transmission control information of the random access channel based on, for example, as a state of the mobile station, quality information indicator at the time the random access channel is transmitted, while further setting, as the transmission control information of the random access channel, transmission power for not increasing interference to peripheral cells, it is possible to enhance the reception quality of the random access channel in the base station apparatus, and therefore, it is possible to improve the delivery probability of the random access channel without increasing the uplink intercell interference amount. Further, for example, by implicitly notifying the quality information indicator using the transmission frequency region of the random access channel, it is possible to increase the information amount notified on the random access channel.

Advantageous Effect of the Invention

According to the present invention, it is possible to improve the delivery probability of a random access channel, while increasing the information amount notified on the random access channel.

BRIEF DESCRIPTION OF DRAWINGS

FIG. 4 is a diagram to explain an example of correspondence between a CQI of the mobile station and the transmission frequency region of the RACH in Embodiment 1;

FIG. 5 is a diagram to explain an example of correspondence between a RACH transmission reason of the mobile station and the transmission frequency region of the RACH in Embodiment 1;

FIG. 6 is a diagram to explain an example of correspondence between the transmission frequency region of the RACH, and a CQI and RACH transmission reason of the mobile station in Embodiment 1;

FIG. 7 is a diagram to explain an example of correspondence between the transmission frequency region of the RACH and a number of a signature, and the CQI and RACH transmission reason of the mobile station in Embodiment 1;

FIG. 8 is a diagram to explain an example of correspondence between the transmission frequency region of the RACH and the number of the signature, and the RACH transmission reason and CQI of the mobile station in Embodiment 1;

FIG. 14 is a diagram to explain an example of correspondence between the CQI of the mobile station and transmission power of the RACH in Embodiment 2;

FIG. 15 is a diagram to explain another example of correspondence between the CQI of the mobile station and transmission power of the RACH in Embodiment 2;

FIG. 16 is a diagram to explain an example of correspondence between transmission power of the RACH and a number of a signature, and the CQI and RACH transmission reason in Embodiment 2;

DESCRIPTION OF SYMBOLS

Figure 1:
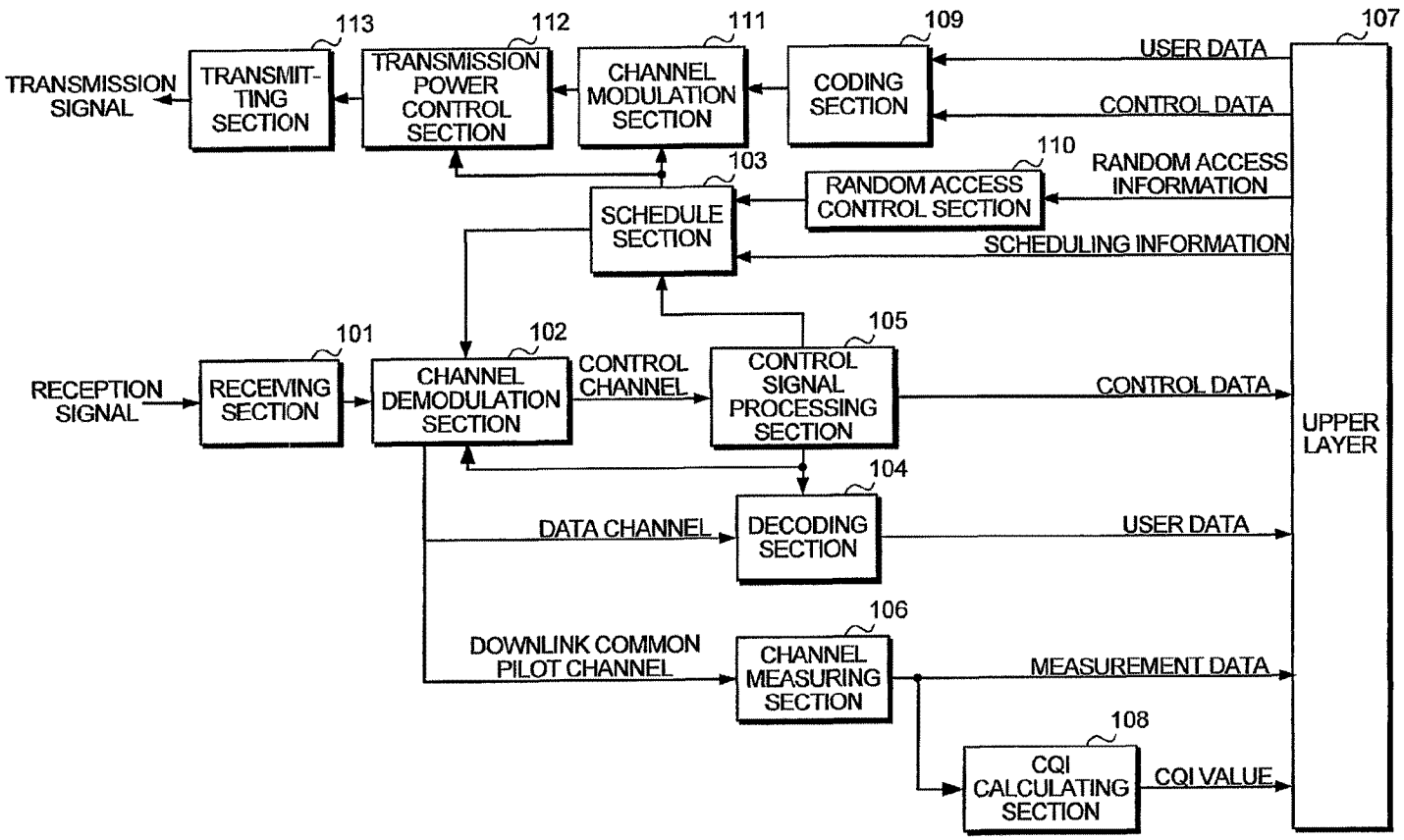
FIG. 1 is a block diagram showing an example of a configuration of a mobile station apparatus included in a mobile communication system according to Embodiment 1 of the present invention.

101, 201 Receiving section
102, 202 Channel demodulation section
103, 203 Schedule section
104, 204 Decoding section
105, 205 Control signal processing section
106 Channel measuring section
107, 207 Upper layer
108 CQI calculating section
109, 208 Coding section
110 Random access control section
111, 209 Channel modulation section
112, 210 Transmission power control section
113, 211 Transmitting section
206 Random access analysis section

BEST MODE FOR CARRYING OUT THE INVENTION

Embodiments of the invention will be described below with reference to accompanying drawings.

Embodiment 1

FIG. 1 is a block diagram showing an example of a configuration of a mobile station apparatus (hereinafter, referred to as a "mobile station") included in a mobile communication system (hereinafter, referred to as a "communication system" as appropriate) according to Embodiment 1 of the present invention. In the mobile station as shown in FIG. 1, a receiving section 101 receives a reception signal. The reception signal received in the receiving section 101 is output to a channel demodulation section 102, demodulated based on scheduling information input from a schedule section 103, and classified into a data channel, control channel, and downlink common pilot channel (DL-CPICH). With respect to each classified data, the data channel is sent to a decoding section 104, the control channel is sent to a control signal processing section 105, and the downlink common pilot channel is sent to a channel measuring section 106. The decoding section 104 extracts user data to send to an upper layer 107. The control signal processing section 105 extracts control data to send to the upper layer 107.

In addition, scheduling information included in the control channel is sent to the schedule section 103. The channel measuring section 106 measures reception quality of the downlink common pilot channel to send to the upper layer 107 as measurement data, while sending the reception quality to a CQI calculating section 108. The CQI calculating section 108 calculates a CQI from the reception quality to send to the upper layer 107 as a CQI value. Upon receiving the CQI value, the upper layer 107 sets random access information as transmission control information including information such as the reception quality (CQI) measured immediately before RACH transmission, RACH transmission reason and the like. In other words, the upper layer 107 functions as the transmission control information setting device.

In addition, as a method of calculating the CQI in the CQI calculating section 108, there are a method of obtaining every time from an instantaneous value of the DL-CP ICH, and another method of averaging for predetermined reception time to obtain, and either method may be used. Further, there are a method of obtaining on a DL-CPICH bass and another method of averaging over some reception band, and both methods are included herein. Furthermore, even when another CQI calculating method is used other than the above-mentioned methods, the subject matter of the present invention is not affected.

Meanwhile, with the onset of a sending request from the upper layer 107, the user data and control data is input to a coding section 109 and encoded as transmission data. Further, the upper layer 107 inputs the scheduling information to the schedule section 103. At the time of random access, the upper layer 107 sends random access information including information such as the reception quality (CQI) measured immediately before RACH transmission, RACH transmission reason and the like to a random access control section 110. The random access control section 110 sends to the schedule section 103 the scheduling information such as a frequency region for transmitting a random access channel, transmission power to set and the like. The user data and control data encoded in the coding section 109 is input to a channel modulation section 111. According to the scheduling information sent from the schedule section 103, the channel modulation section 111 performs modulation processing on the transmission data with a suitable modulation scheme, and concurrently, performs mapping onto a suitable uplink channel. The modulated data is subjected to power control according to the channel in a transmission power control section 112 and transmitted from a transmitting section 113. In addition, other components of the mobile station are not related to the present invention and omitted. Further, the operation of each block is subjected to centralized control by the upper layer 107.

Figure 2:
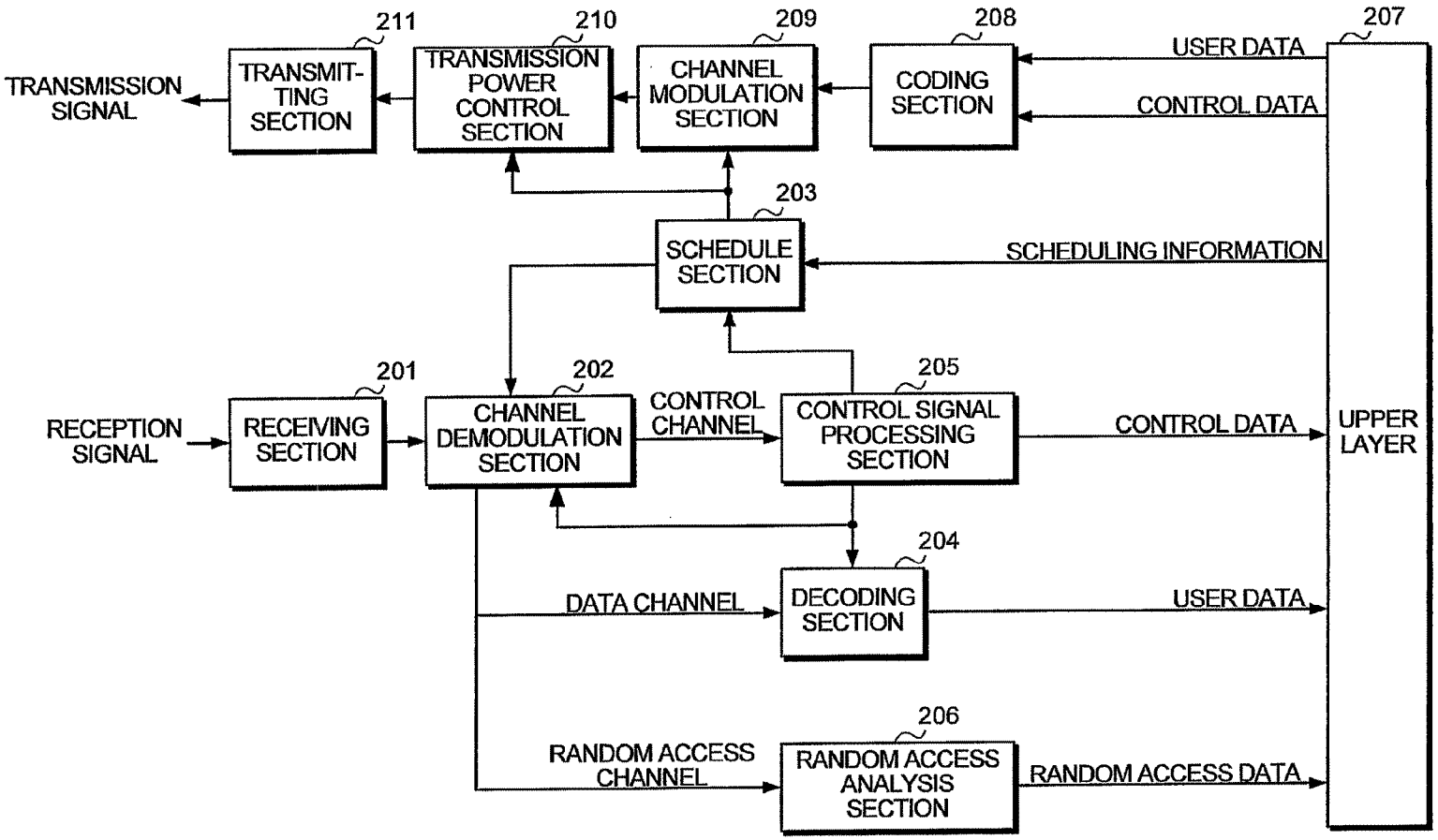
FIG. 2 is a block diagram showing an example of a configuration of a base station apparatus included in the mobile communication system according to Embodiment 1.

FIG. 2 is a block diagram showing an example of a configuration of a base station apparatus (hereinafter, referred to as a "base station") included in the mobile communication system according to Embodiment 1. In the base station as shown in FIG. 2, a receiving section 201 receives a reception signal (transmission signal from a mobile station). The reception signal received in the receiving section 201 is output to a channel demodulation section 202, demodulated based on scheduling information input from a schedule section 203, and classified into a data channel, control channel, and random access channel. With respect to each demodulated data, the data channel is sent to a decoding section 204, the control channel is sent to a control signal processing section 205, and the random access channel is sent to a random access analysis section 206. The decoding section 204 performs decoding processing on user data to send to an upper layer 207. The control signal processing section 205 extracts control data to send to the upper layer 207. Further, control data associated with control of the channel demodulation section 202 and decoding section 204 is sent to each block. The random access analysis section 206 analyzes a frequency region in which the random access channel was transmitted, signature of a RACH Preamble, and reception quality of the random access channel, and sends the analyzed data to the upper layer 207. The upper layer 207 judges a state of the mobile station based on the analyzed data, while determining optimal scheduling information corresponding to the state of the mobile station. In other words, the upper layer 207 functions as the scheduling device.

Meanwhile, with the onset of a sending request from the upper layer 207, the user data and control data is input to a coding section 208. Further, the upper layer inputs the scheduling information to the schedule section 203. The user data and control data encoded in the coding section 208 is input to a channel modulation section 209. According to the scheduling information input from the schedule section 203, the channel modulation section 209 performs modulation processing on the transmission data with a suitable modulation scheme, and concurrently, performs mapping onto a suitable downlink channel. The modulated data is subjected to power control according to the channel in a transmission power control section 210 and transmitted from a transmitting section 211. In addition, other components of the base station are not related to the present invention and omitted. Further, the operation of each block is subjected to centralized control by the upper layer 207.

Figure 3:
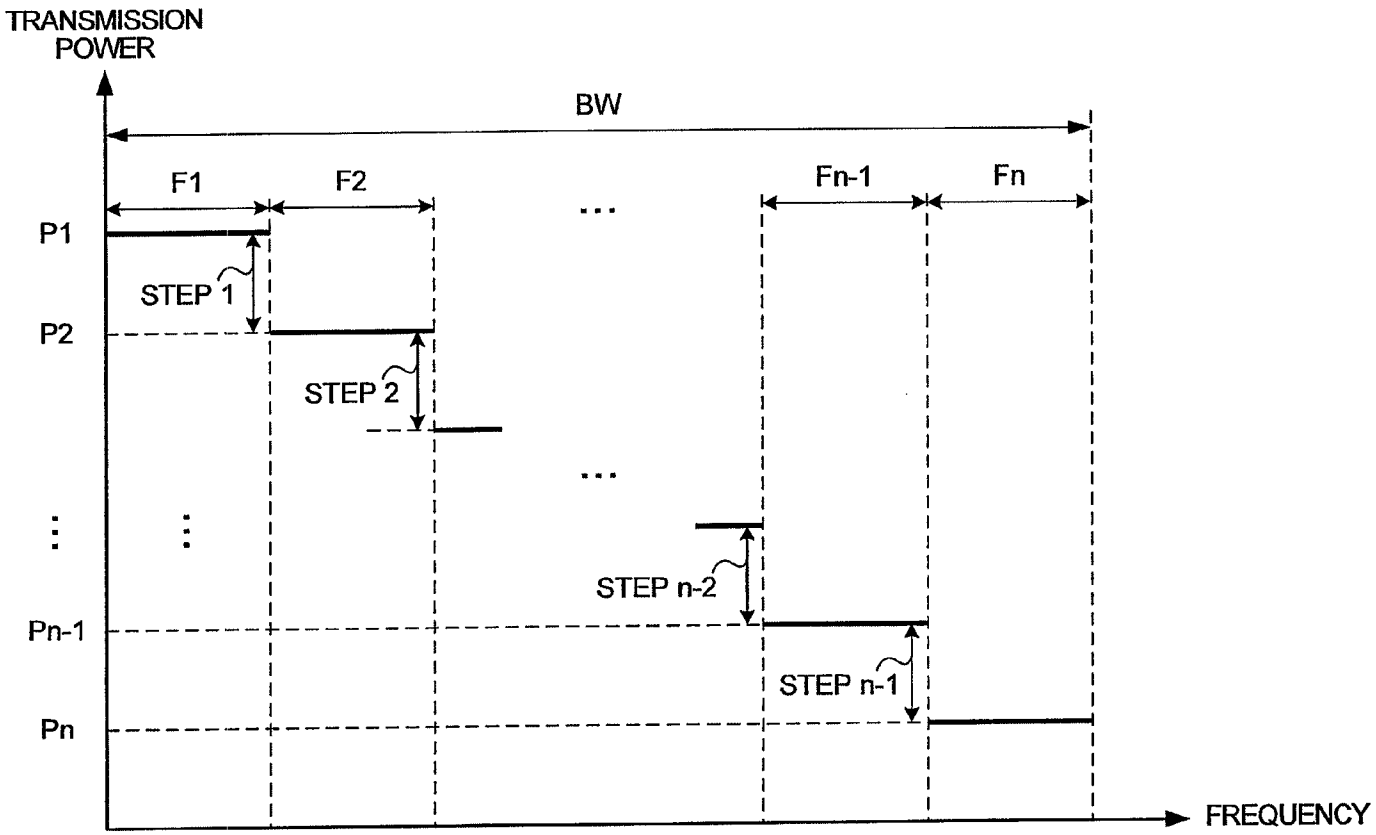
FIG. 3 is a diagram to explain the relationship between a transmission frequency region and transmission power of a RACH in Embodiment 1.

FIG. 3 is a diagram to explain uplink frequency regions used in RACH transmission, and transmission power in the transmission in the mobile communication system according to Embodiment 1. In FIG. 3, BW represents a transmission/reception bandwidth of the base station, and in EUTRA, the transmission/reception bandwidth may vary with the base station (for example, 1.25 MHz, 2.5 MHz, 5 MHz, 10 MHz and 20 MHz). F1, F2 . . . , Fn (n is a natural number except 0) are frequency regions comprised of a plurality of subcarriers divided from the transmission/reception bandwidth of the base station, and a frequency region to use is determined according to the reception quality of the mobile station. FIG. 3 shows that mobile stations are divided into n groups according to the reception quality. P1, P2, . . . , Pn represent maximum power values allowing transmission without increasing interference to peripheral cells in respective frequency regions. In addition, P1, P2, . . . , Pn are set not to exceed the maximum transmission power of mobile stations in consideration of the capability of mobile stations (UE capability). Each of STEP1, STEP2, . . . , STEPn−1 represents a difference between some frequency region and an adjacent frequency region. In addition, F1, F2, . . . , Fn may have the same values or different values. Similarly, STEP1, STEP2, . . . , STEPn−1 may have the same values or different values. Further, the values may differ for each base station.

When transmitting a RACH to the base station, the mobile station selects one from among frequency regions F1 to Fn according to the information for implicitly notifying the base station. At this time, as the transmission power of the RACH, the mobile station sets maximum transmission power P1-Pn corresponding to the selected frequency region. In the communication system according to Embodiment 1, mutually different maximum transmission power that does not increase interference to peripheral cells is beforehand determined for each frequency region, and as the transmission control information, by setting a transmission frequency region, while further setting the maximum transmission power corresponding to the frequency region, it is possible to enhance the reception quality of the random access channel in the base station. Therefore, it is possible to improve the delivery probability of the random access channel without increasing the uplink intercell interference amount. Variations thereof are shown below.

FIG. 4 is a diagram to explain an example of correspondence between a transmission frequency region of the RACH and CQI in the case of transmitting a CQI (more specifically, Downlink CQI) as the information to implicitly notify the base station from the mobile station. In FIG. 4, there are eight classified regions (n=8) as the frequency region, and CQIs are classified into five stages i.e. Very high, High, Medium, Low, and Very Low. The lower number or higher number of classifications is allowed. Further, the CQI to classify may be evenly classed with respect to the range of the CQI, or the range may be varied corresponding to the distribution density of CQI. Furthermore, the range may be varied with each base station.

The mobile station transmits the RACH to the base station in the frequency region corresponding to the CQI measured immediately before RACH transmission. When there is a plurality of corresponding frequency regions, the mobile station randomly selects one from among the regions. In other words, herein, the transmission control information at the time of RACH transmission is set based on the CQI as the state of the mobile station, and the transmission frequency region and transmission power of the RACH is set as the transmission control information at the time of RACH transmission. In the example as shown in FIG. 4, when the CQI measured immediately before is "High", F2 and F3 can be selected as the frequency region. The mobile station randomly selects either one of F2 and F3, sets transmission power P2 when the selected frequency region is F2 or transmission power P3 when the selected frequency region is F3, and transmits the RACH.

The base station receiving the RACH transmitted with the transmission control information thus set is capable of grasping the CQI of the mobile station from the frequency region in which the RACH is received. Using thus recognized CQI of the mobile station, the base station suitably determines distribution of radio resources to allocate to the mobile station, modulation scheme to use and the like to perform scheduling. For example, when receiving the RACH from a mobile station with a high CQI, it is possible to perform scheduling such that more radio resources than usual are allocated to improve throughput, and that data transmission is started using a modulation scheme with a high transmission rate. On the other hand, when receiving the RACH from a mobile station with a poor CQI, it is possible to perform scheduling such that radio resources are limited to be less than usual, and that data transmission is started using a modulation scheme with a high error correcting capability.

Particularly, in the example as shown in FIG. 4, since the transmission frequency region of the RACH is set based on the CQI at the time of RACH transmission, it is possible to implicitly notify the base station of the CQI in transmitting the RACH through the transmission frequency region, and therefore, it is possible to increase the information amount notified on the RACH.

FIG. 5 is a diagram to explain an example of correspondence between a transmission frequency region of the RACH and reason of RACH transmission (hereinafter, referred to as a "RACH transmission reason" as appropriate) in the case of transmitting the RACH transmission reason as the information to implicitly notify the base station from the mobile station. In FIG. 5, there are eight classified regions (n=8) as the frequency region, and RACH transmission reasons are classified into five items i.e. initial transmission, resource request, handover, intermittent transmission, and synchronization confirmation. The lower or higher number of classifications is allowed corresponding to circumstances where the RACH is used. Considered as other RACH transmission reasons are re-connection, urgent call issue and the like.

The mobile station determines a matter to be a reason of RACH transmission from the state of the mobile station at the time of RACH transmission and the like, and transmits the RACH to the base station in the corresponding frequency region. When there is a plurality of corresponding frequency regions, the mobile station randomly selects one from among the regions. At this point, as shown in FIG. 3, the mobile station sets transmission power associated with the selected frequency region. In other words, herein, the transmission control information at the time of RACH transmission is set based on the RACH transmission reason as the state of the mobile station, and the transmission frequency region and transmission power of the RACH is set as the transmission control information at the time of RACH transmission. In the example as shown in FIG. 5, when the RACH transmission reason is "resource request", F2 and F3 can be selected as the frequency region. The mobile station randomly selects either one of F2 and F3, sets transmission power P2 when the selected frequency region is F2 or transmission power P3 when the selected frequency region is F3, and transmits the RACH.

The base station receiving the RACH transmitted with the transmission control information thus set is capable of grasping the RACH transmission reason from the frequency region in which the RACH is received. Using thus recognized RACH transmission reason of the mobile station, the base station suitably determines distribution of radio resources to allocate to the mobile station, modulation scheme to use and the like to perform scheduling. For example, when the RACH transmission reason is initial transmission, it is possible to perform scheduling such that relatively few radio resources are allocated without allocating many radio resources from the beginning. Further, when the RACH transmission reason is handover, since it is necessary to use current radio resources and modulation scheme similarly in a handover-destination cell, it is possible to perform scheduling such that current scheduling is continued without needing additional information.

Particularly, in the example as shown in FIG. 5, since the transmission frequency region of the RACH is set based on the transmission reason of the RACH, it is possible to implicitly notify the base station of the transmission reason of the to RACH through the transmission frequency region of the RAC, and therefore, it is possible to increase the information amount notified on the RACH.

FIG. 6 is a diagram to explain an example of correspondence between a transmission frequency region of the RACH and CQI and RACH transmission reason in the case of transmitting both of the CQI and RACH transmission reason as the information to implicitly notify the base station from the mobile station. In FIG. 6, as the frequency region, there are sixteen classified regions (n=16). The CQI and RACH transmission reason are classified respectively in the same way as in FIGS. 4 and 5, but the lower or higher of classifications than in FIG. 6 is allowed.

In addition, as shown in FIG. 6, the number of classes of the frequency region may be varied for each RACH transmission reason. In FIG. 6, CQIs are classified into five classes when the RACH transmission reason is initial transmission, while being classified into three classes in the case of a resource request, and being classified into two classes in the case of synchronization confirmation. In this case, the number of classes for each RACH transmission reason, and thresholds used to classify are different from one another, and beforehand notified or broadcast to the mobile station.

The mobile station transmits the RACH to the base station in the frequency region corresponding to the CQI measured immediately before RACH transmission and RACH transmission reason. At this point, as shown in FIG. 3, the mobile station sets transmission power corresponding to the selected frequency region. In other words, herein, the transmission control information at the time of RACH transmission is set based on the CQI and the RACH transmission reason as the state of the mobile station, and the transmission frequency region and transmission power of the RACH is set as the transmission control information at the time of RACH transmission. In the example as shown in FIG. 6, when the CQI measured immediately before is "High" and RACH transmission reason is "resource request", F6 is selected as the frequency region. The mobile station sets transmission power P6 corresponding to F6 that is the selected frequency region, and transmits the RACH.

The base station receiving the RACH transmitted with the transmission control information thus set is capable of grasping the CQI and RACH transmission reason of the mobile station from the frequency region in which the RACH is received. Using thus recognized CQI and RACH transmission reason of the mobile station, the base station is capable of suitably determining distribution of radio resources to allocate to the mobile station, modulation scheme to use and the like to perform scheduling.

Particularly, in the example as shown in FIG. 6, since the transmission frequency region of the RACH is set based on a combination of the CQI at the time of RACH transmission and transmission reason of the RACH, it is possible to implicitly notify the base station of a quality information indicator in transmitting the RACH and the transmission reason of the RACH through the transmission frequency region, and therefore, it is possible to increase the information amount notified on the RACH.

FIG. 7 is a diagram to explain an example of correspondence between a transmission frequency region of the RACH and a number of a signature, and the CQI and RACH transmission reason in the case of transmitting both of the CQI and RACH transmission reason as the information to implicitly notify the base station from the mobile station. In FIG. 7, there are eight classified regions (n=8) as the frequency region. The CQI and RACH transmission reason are classified respectively in the same way as in FIGS. 4 and 5, but the lower or higher of classifications than in FIG. 7 is allowed.

The mobile station selects a frequency region corresponding to the CQI measured immediately before RACH transmission, and selects a signature to form a RACH preamble from the RACH transmission reason. When there is a plurality of corresponding frequency regions or signatures, the mobile station randomly selects one from among them. At this point, as shown in FIG. 3, the mobile station sets transmission power corresponding to the selected frequency region. In other words, herein, the transmission control information at the time of RACH transmission is set based on the CQI and the RACH transmission reason as the state of the mobile station, and the transmission frequency region, transmission power and signature of the RACH is set as the transmission control information at the time of RACH transmission. In the example as shown in FIG. 7, when the CQI measured immediately before is "High" and RACH transmission reason is "resource request", F2 and F3 can be selected as the frequency region, and "11" to "15" can be selected as the signature. The mobile station randomly selects one signature from "11" to "15", further randomly selects either one frequency region F2 or F3, sets transmission power P2 when the selected frequency region is F2, or transmission power P3 when the selected frequency region is F3, and transmits the RACH.

In addition, as a method of transmitting a RACH preamble including the selected signature, considered are a method of transmitting only a RACH preamble, and another method of transmitting a RACH preamble and RACH message at the same time. However, the invention is not affected in the case of using either method, and therefore, both methods are allowed.

The base station receiving the RACH transmitted with the transmission control information thus set is capable of grasping the CQI of the mobile station from the frequency region in which the RACH is received. Further, the base station is capable of grasping the RACH transmission reason of the mobile station from the signature number. Using thus recognized CQI and RACH transmission reason of the mobile station, the base station is capable of suitably determining distribution of radio resources to allocate to the mobile station, modulation scheme to use and the like to perform scheduling.

Particularly, in the example as shown in FIG. 7, since the transmission frequency region of the RACH is set based on the CQI at the time of RACH transmission, while the signature is set based on the transmission reason of the RACH, it is possible to implicitly notify the base station of the CQI in transmitting the RACH through the transmission frequency region, and to implicitly notify the base station of the transmission reason of the RACH through the signature, and therefore, it is possible to increase the information amount notified on the RACH.

FIG. 8 is a diagram to explain an example of correspondence between a transmission frequency region of the RACH and a number of a signature, and the RACH transmission reason and CQI in the case of transmitting both of the CQI and RACH transmission reason as the information to implicitly notify the base station from the mobile station. In FIG. 8, there are eight classified regions (n=8) as the frequency region. The CQI and RACH transmission reason are classified respectively in the same way as in FIGS. 4 and 5, but the lower or higher of classifications than in FIG. 8 is allowed. Further, the CQI to classify may be evenly classed with respect to the range of the CQI, or the range may be varied corresponding to the distribution density of CQI. Furthermore, the range may be varied with each base station.

The mobile station selects a signature to form a RACH preamble corresponding to the CQI measured immediately before RACH transmission, and selects a frequency region from the RACH transmission reason. When there is a plurality of corresponding signatures or frequency regions, the mobile station randomly selects one from among them. At this point, as shown in FIG. 3, the mobile station sets transmission power corresponding to the selected frequency region. In other words, herein, the transmission control information at the time of RACH transmission is set based on the CQI and the RACH transmission reason as the state of the mobile station, and further, the transmission frequency region, transmission power and signature of the RACH are set as the transmission control information at the time of RACH transmission. In the example as shown in FIG. 8, when the CQI measured immediately before is "High" and RACH transmission reason is "resource request", "6" to "12" can be selected as the signature, and F3 and F4 can be selected as the frequency region. The mobile station randomly selects one signature from "6" to "12", further randomly selects either one frequency region F3 or F4, sets transmission power P3 when the selected frequency region is F3, or transmission power P4 when the selected frequency region is F4, and transmits the RACH.

In addition, as a method of transmitting a RACH preamble including the selected signature, considered are a method of transmitting only a RACH preamble, and another method of transmitting a RACH preamble and RACH message at the same time. However, the invention is not affected in the case of using either method, and therefore, both methods are allowed.

The base station receiving the RACH transmitted with the transmission control information thus set is capable of grasping the CQI of the mobile station from the signature number. Further, the base station is capable of grasping the RACH transmission reason of the mobile station from the frequency region in which the RACH is received. Using thus recognized CQI and RACH transmission reason of the mobile station, the base station is capable of suitably determining distribution of radio resources to allocate to the mobile station, modulation scheme to use and the like to perform scheduling.

Particularly, in the example as shown in FIG. 8, since the signature is set based on the CQI at the time of RACH transmission, while the transmission frequency region is set based on the transmission reason of the RACH, it is possible to implicitly notify the base station of the CQI in transmitting the RACH through the signature, and to implicitly notify the base station of the transmission reason of the RACH through the transmission frequency region, and therefore, it is possible to increase the information amount notified on the RACH.

In addition, in FIGS. 4 to 8, CQIs, frequency regions (F1~Fn), signature numbers, corresponding maximum transmission power (P1~Pn), and differences (STEP1~STEPn−1) in maximum transmission power, which are used for RACH transmission, are acquired before RACH transmission by being notified on the control channel from the base station, or by receiving broadcast information. Further, the RACH transmission reason is acquired by a mobile station determining a state of the mobile station. Furthermore, the above-mentioned number of frequency regions included in the CQI or RACH transmission reason is allowed to vary with each base station. For example, in a base station just under which exists a mobile station-density area, the collision probability of the RACH may be reduced by allocating the higher number of frequency regions to CQI=Very high than other CQIs.

Figure 9:
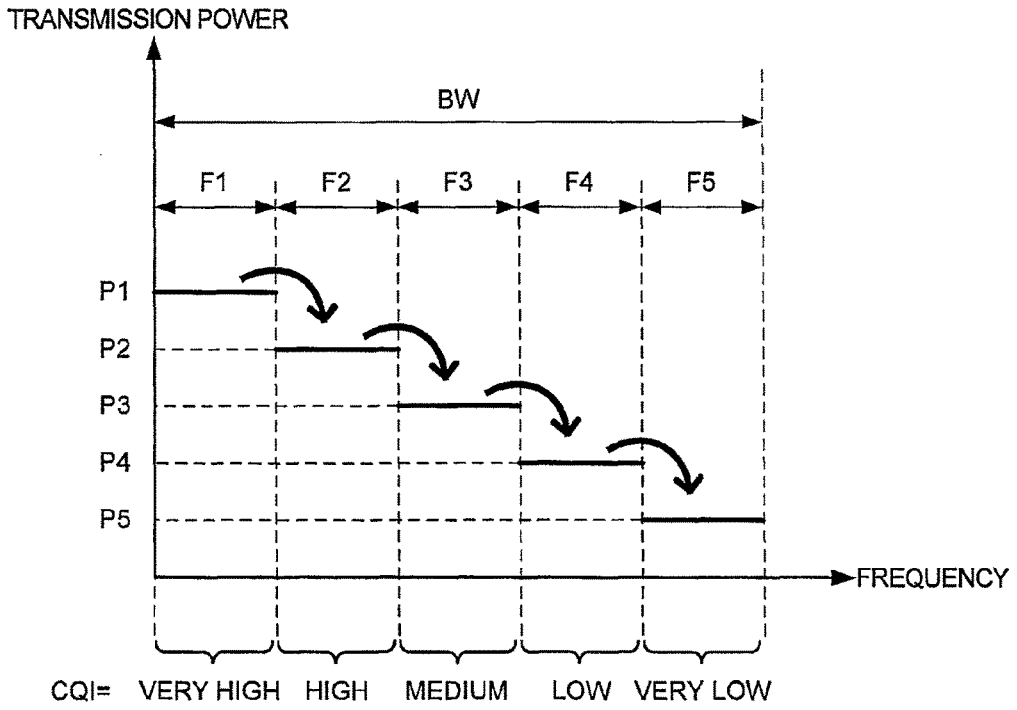
FIG. 9 is a diagram showing an example of a retransmission method of the RACH in the case of notifying the CQI of the mobile station with the transmission frequency region of the RACH in Embodiment 1.

FIG. 9 is a diagram showing an example of a retransmission method of the RACH in the case of notifying the CQI with a transmission frequency region of the RACH. In addition, in FIG. 9, the frequency range is divided into five frequency regions, and the frequency regions correspond to CQI=Very high, High, Medium, Low, Very low. Further, the CQI to classify may be evenly classed with respect to the range of the CQI, or the range may be varied corresponding to the distribution density of CQI. Furthermore, the range may be varied with each base station.

When the CQI is notified with the transmission frequency region of the RACH (FIGS. 4 and 6), in the case where the mobile station cannot receive ACK from the base station in response to RACH transmission, or the mobile station receives NACK, the mobile station randomly selects a signature again, and retransmits a RACH preamble formed of the selected signature in the frequency region indicative of the same CQI. When the mobile station cannot receive ACK even after repeating the retransmission m times (m is a natural number except 0), the mobile station shifts the frequency region to another region so that the CQI is lowered by "1", and resets the transmission power to perform retransmission. In addition, when the class of CQI is already the range of the lowest value (Very low in FIG. 9), the retransmission is performed in the same frequency region. In addition, with respect to the number m of retransmissions, the number is beforehand defined, or notified on the control channel from the base station, or the broadcast information is received, and thus, the mobile station acquires the number before RACH transmission.

When the CQI is notified with the transmission frequency region of the RACH and the RACH transmission reason is notified with the signature (FIG. 7), in the case where the mobile station cannot receive ACK from the base station in response to RACH transmission, or the mobile station receives NACK, the mobile station randomly selects one from among signatures corresponding to the RACH transmission reason, and retransmits a RACH preamble formed of the selected signature in the frequency region indicative of the same CQI. When the mobile station cannot receive ACK even after repeating the retransmission m times (m is a natural number except 0), the mobile station shifts the frequency region to another region so that the CQI is poorer by "1", and resets the transmission power to perform retransmission. In addition, when the class of CQI is already the range of the lowest value, the retransmission is performed in the same frequency region.

FIG. 9 is the example showing the case (FIGS. 4, 6 and 7) of notifying the CQI with the frequency transmission region of the RACH, and retransmission methods will be described below in the case where the CQI is not notified with the frequency transmission region of the RACH.

When the RACH retransmission reason is notified with the transmission frequency region of the RACH (FIG. 5), in the case where the mobile station cannot receive ACK from the base station in response to RACH transmission, or the mobile station receives NACK, the mobile station randomly selects a signature again, and retransmits a RACH preamble formed of the selected signature in the frequency region indicative of the same RACH transmission reason.

When the CQI is notified with the signature of the RACH and the RACH transmission reason is notified with the transmission frequency region (FIG. 8), in the case where the mobile station cannot receive ACK from the base station in response to RACH transmission, or the mobile station receives NACK, the mobile station randomly selects one from among signatures corresponding to the CQI of the mobile station, and retransmits a RACH preamble formed of the selected signature in the frequency region indicative of the same RACH transmission reason. When the mobile station cannot receive ACK even after repeating the retransmission m times (m is a natural number except 0), the mobile station shifts the signature to another signature so that the CQI is poorer by "1", and performs retransmission. In addition, when the class of CQI is already the range of the lowest value, the retransmission is performed in the same frequency region.

Meanwhile, FIG. 3 shows an example of the case that the transmission bandwidth used in RACH transmission is matched with a bandwidth of the frequency region used by the mobile station in uplink transmission, and another example will be described below that the bandwidths are different from one another.

Figure 10:
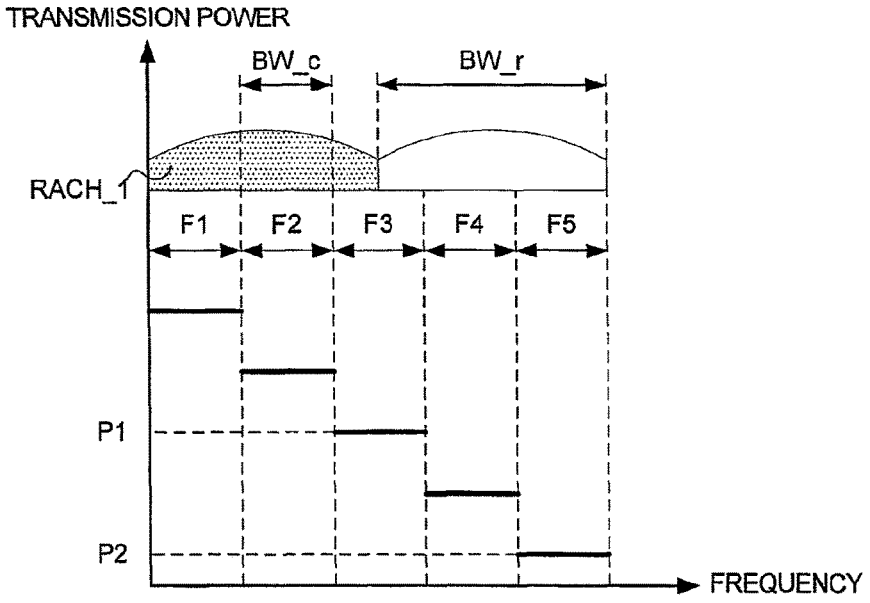
FIG. 10 is a diagram showing an example of setting transmission power in the case that a transmission bandwidth of the RACH is wider than a frequency region used by the mobile station in uplink transmission in Embodiment 1.

FIG. 10 is a diagram showing an example of setting transmission power in the case that the transmission bandwidth used in RACH transmission is wider than a bandwidth of the frequency region used by the mobile station in uplink transmission. In FIG. 10, assuming that the frequency region used by the mobile station in uplink transmission is BW_c, and that the transmission bandwidth of the RACH is BW_r, the relationship of BW_c<BW_r holds. In this case, as the transmission power of the RACH, the mobile station sets the lowest power value included in the frequency region of the RACH. In the example as shown in FIG. 10, when the mobile station uses RACH_1, F1 to F3 are included as the frequency region. The mobile station transmits the RACH to the base station with transmission power P1 that is the lowest power value corresponding to F3.

Figure 11:
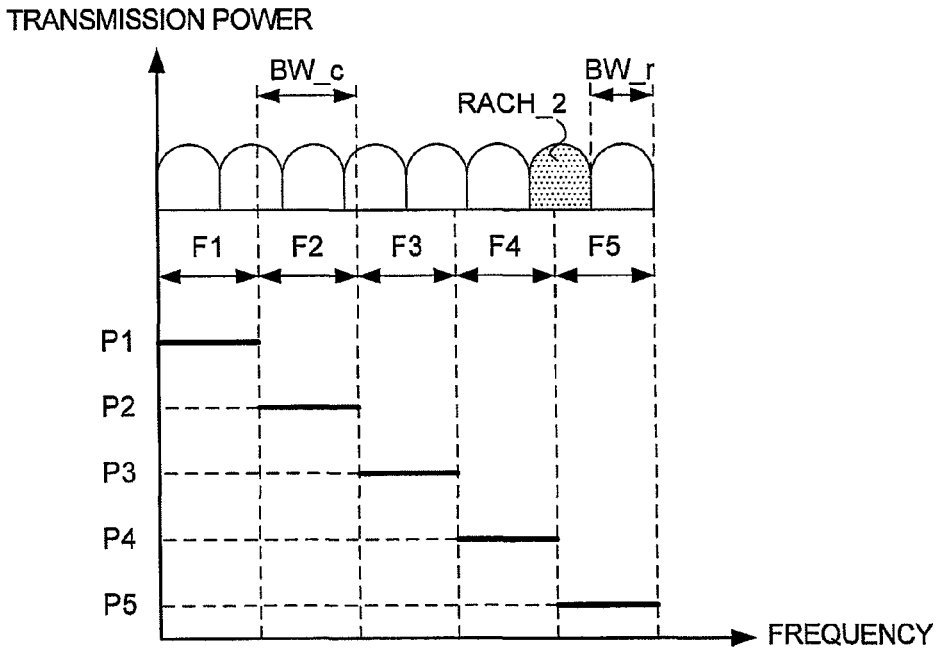
FIG. 11 is a diagram showing an example of setting transmission power in the case that the transmission bandwidth of the RACH is narrower than the frequency region used by the mobile station in uplink transmission in Embodiment 1.

FIG. 11 is a diagram showing an example of setting transmission power in the case that the transmission bandwidth used in RACH transmission is narrower than a bandwidth of the frequency region used by the mobile station in uplink transmission. In FIG. 11, as in FIG. 10, assuming that the frequency region used by the mobile station in uplink transmission is BW_c, and that the transmission bandwidth of the RACH is BW_r, the relationship of BW_c>BW_r holds. In this case, as the transmission power of the RACH, the mobile station sets the lowest power value included in the frequency region of the RACH. In the example as shown in FIG. 11, when the mobile station uses RACH_2, F4 and F5 are included as the frequency region. The mobile station transmits the RACH to the base station with transmission power P5 that is the lowest power value corresponding to F5.

Thus, according to the communication system according to Embodiment 1, mutually different maximum transmission power that does not increase interference to peripheral cells is beforehand determined for each transmission frequency region of the RACH, the transmission frequency region is set as the transmission control information, while the maximum transmission power is set corresponding to the frequency region, it is thereby possible to enhance the reception quality of the RACH in the base station, and therefore, it is possible to improve the delivery probability of the RACH without increasing the uplink intercell interference amount. In addition, any power values may be set other than the maximum transmission power, as long as the power values do not increase interference to peripheral cells.

Further, for example, since the transmission frequency region is set based on the CQI at the time of RACH transmission, it is possible to implicitly notify the base station of the CQI at the time of RACH transmission through the transmission frequency region, and therefore, it is possible to increase the information amount notified on the RACH. Particularly, the number of usable signatures is not significantly limited unlike the conventional way, and it is thereby possible to drastically reduce the collision probability of the RACH.

Embodiment 2

In the communication system according to Embodiment 1, when the frequency bandwidth of the base station is a relatively narrow bandwidth such as, for example, 1.25 MHz and 2.5 MHz, and is not sufficiently wide as compared with the transmission bandwidth of the RACH, there is the possibility that required information cannot be notified to the base station. Therefore, in a communication system according to Embodiment 2, the information is implicitly notified to the base station with the transmission power of the RACH in the mobile station, in other words, the reception power (reception quality) of the RACH in the base station. In addition, configurations of the mobile station and base station constituting the communication system according to Embodiment 2 are the same as those in the communication system according to Embodiment 1, and descriptions thereof are omitted.

Figure 12:
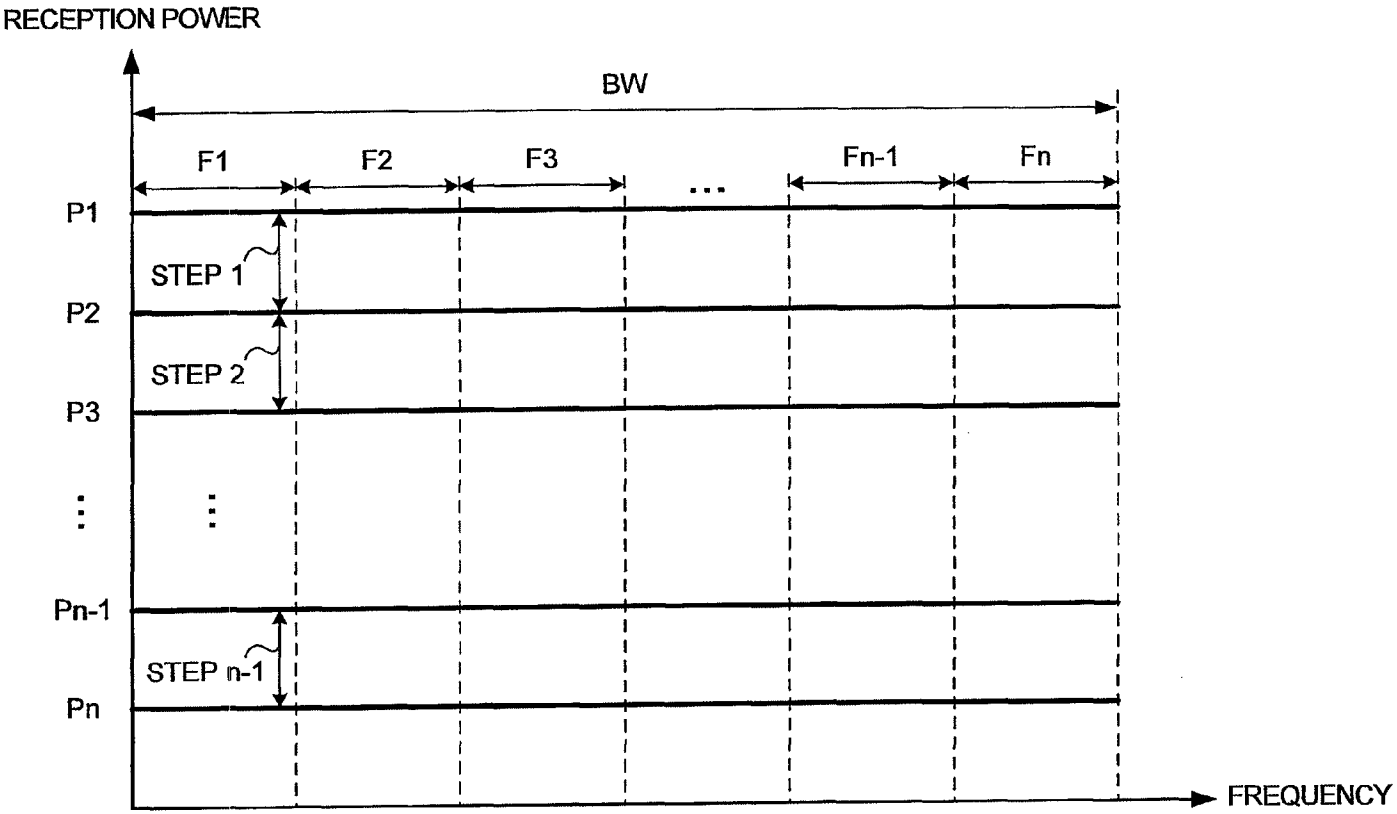
FIG. 12 is a diagram to explain the relationship between transmission frequency regions of the RACH transmission and transmission power according to Embodiment 2.

FIG. 12 is a diagram to explain uplink frequency regions used in RACH transmission, and transmission power in the transmission in the mobile communication system according to Embodiment 2. In FIG. 12, BW represents a transmission/ reception bandwidth of the base station, and in EUTRA, the transmission/reception bandwidth may vary with the base station (for example, 1.25 MHz, 2.5 MHz, 5 MHz, 10 MHz and 20 MHz). F1, F2, . . . , Fn (n is a natural number except j) are frequency regions comprised of a plurality of subcarriers divided from the transmission/reception bandwidth of the base station, and a frequency region to use is determined according to the reception quality of the mobile station. FIG. 12 shows that mobile stations are divided into n groups according to the reception quality. P1, P2, . . . , Pn represent power values allowing transmission without increasing interference to peripheral cells in respective frequency regions. Each of STEP1, STEP2, . . . , STEPn−1 represents a difference between some frequency region and an adjacent frequency region. In addition, F1, F2, . . . , Fn may have the same values or different values. Similarly, STEP1, STEP2, . . . , STEPn−1 may have the same values or different values. Further, the values may differ for each base station.

Figure 13:
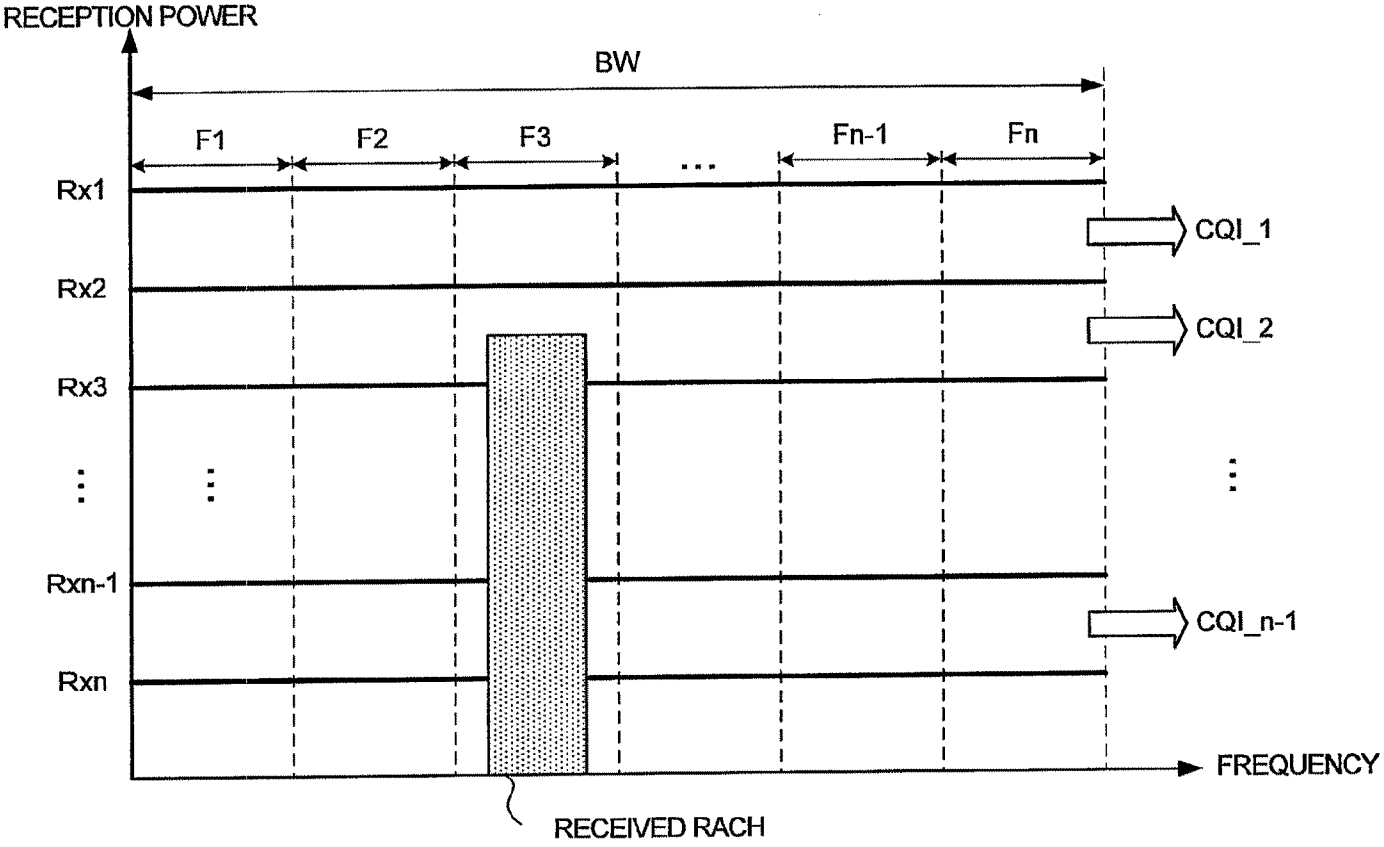
FIG. 13 is a diagram showing an example of estimating the CQI of the mobile station from a reception power value of the RACH in Embodiment 2.
Figure 17:
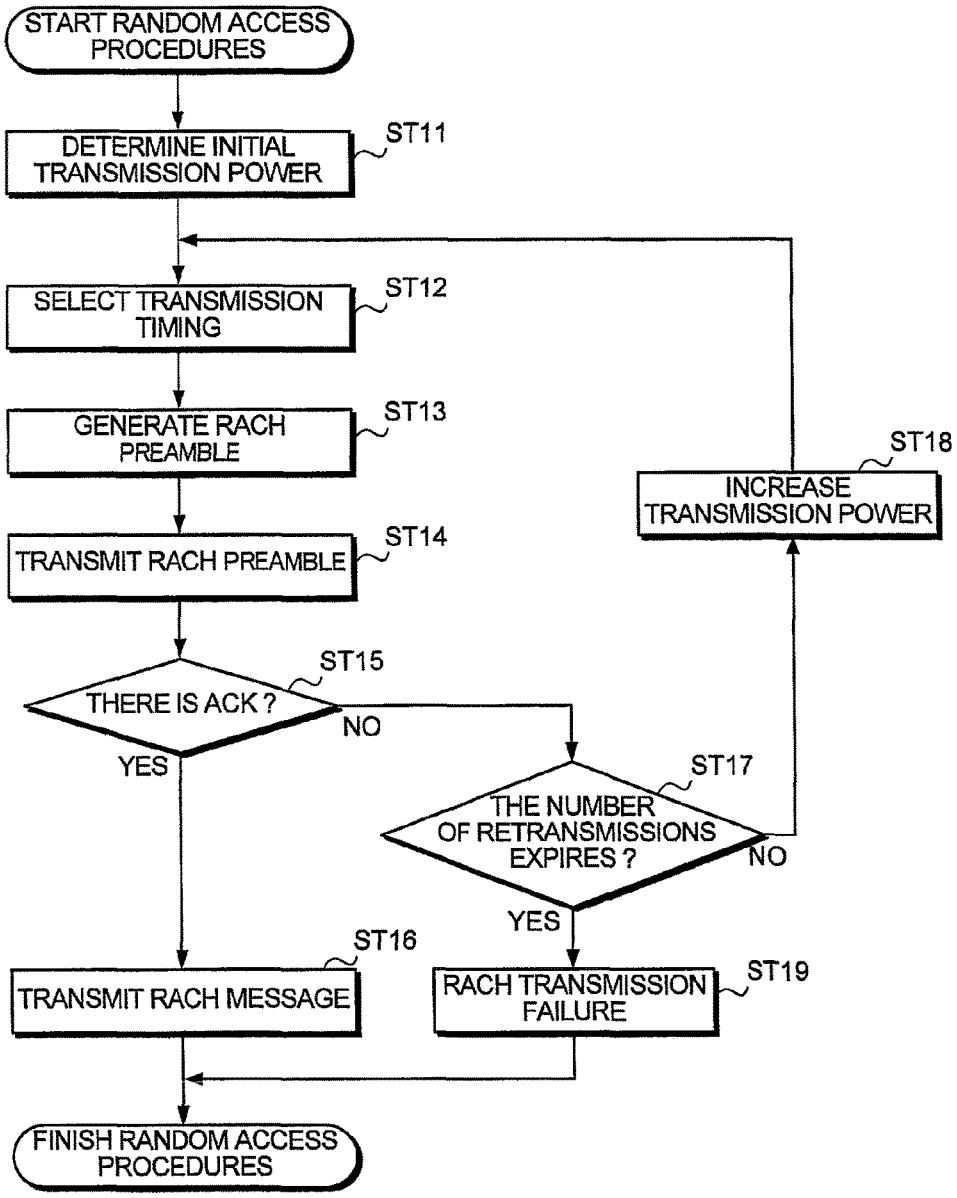
FIG. 17 is a flowchart to explain transmission procedures in random access in the W-CDMA system.
Figure 18:
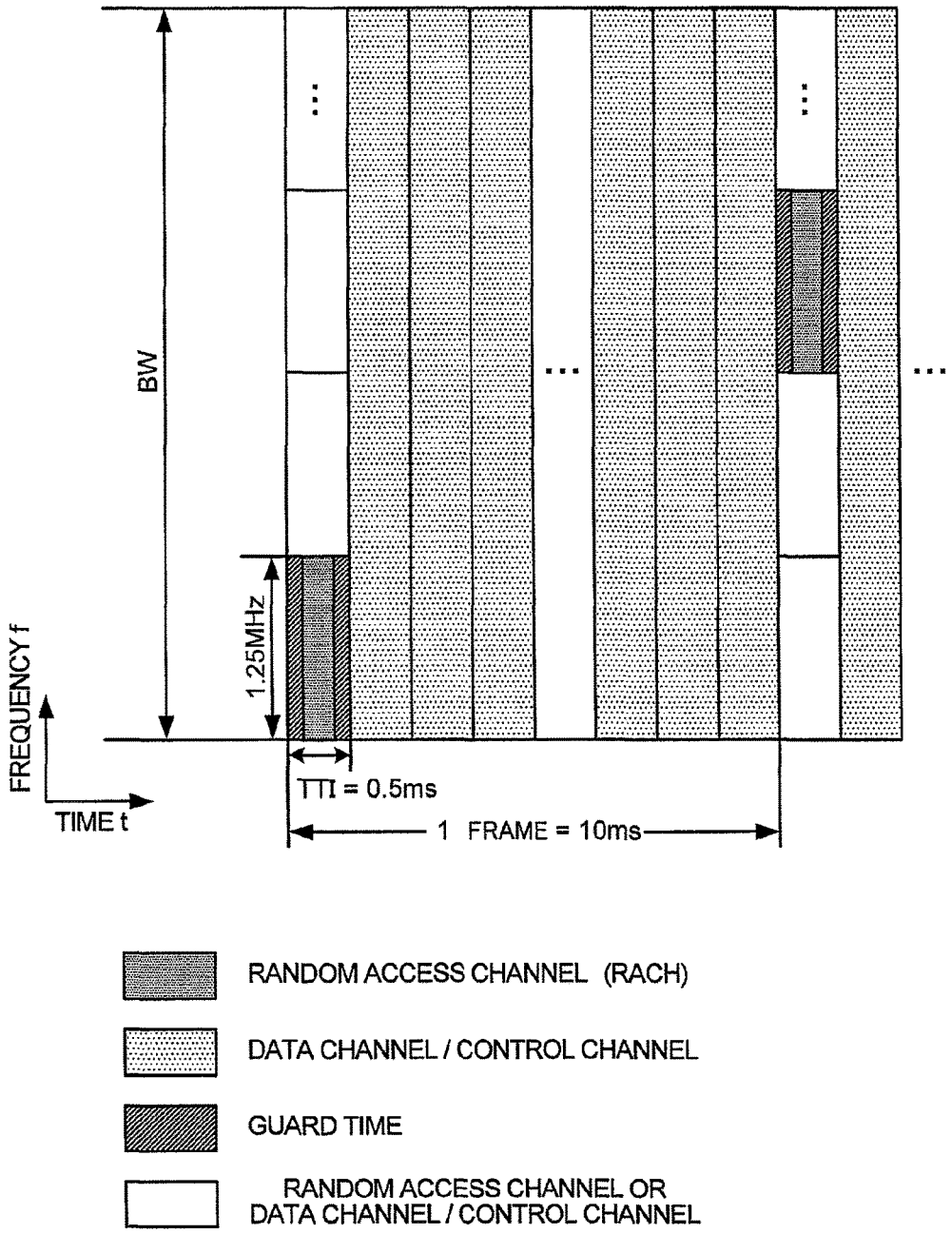
FIG. 18 is a diagram showing an example of channel mapping of the RACH proposed in EUTRA.
Figures 19, 20:
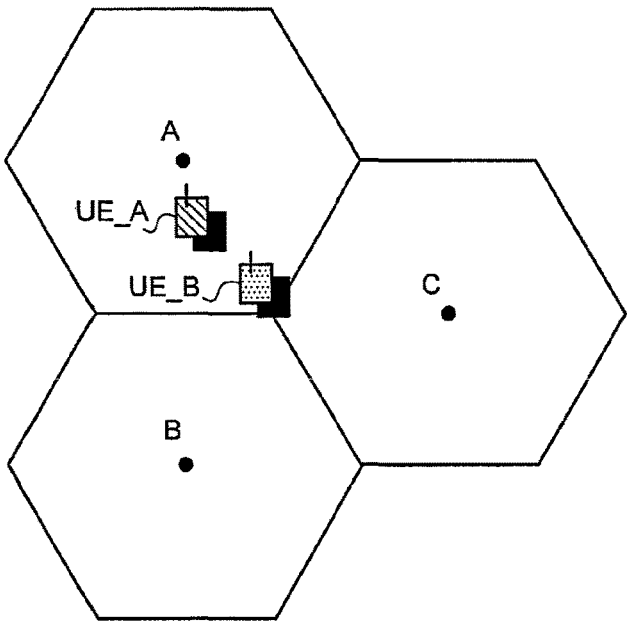
FIG. 19 is a diagram showing an example of a method of notifying the base station of the CQI and transmission reason of the RACH using a signature number at the time of random access.
FIG. 20 is a diagram showing the positional relationship between a cell and mobile station.
Figure 21:
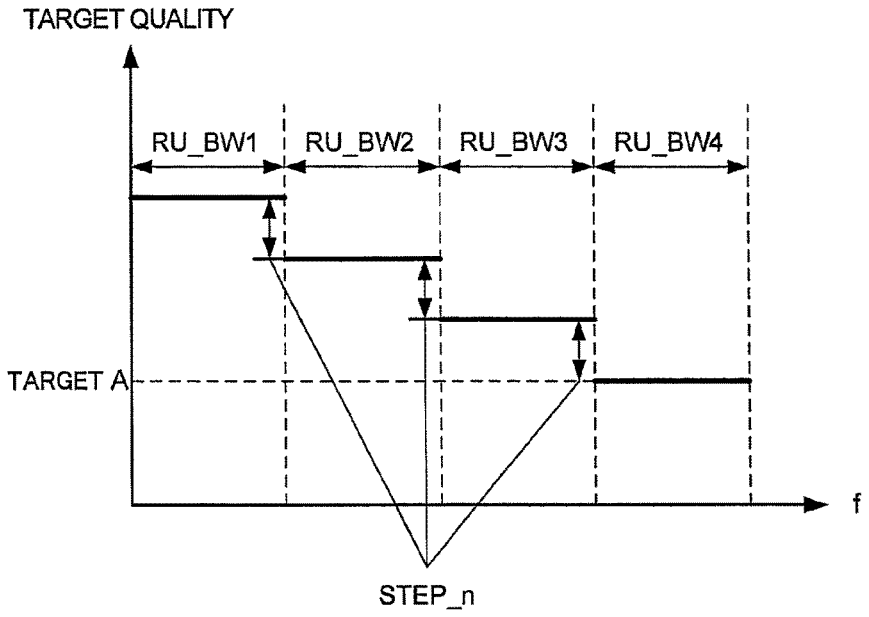
FIG. 21 is a diagram showing an example of applying different target quality for each frequency region that is divided for interference control in uplink frequency regions.

When transmitting a RACH to the base station, the mobile station sets the transmission power of the RACH at a value included in the range of two adjacent values among P1 to Pn according to the information to implicitly notify the base station, and transmits the RACH in an arbitrary frequency region. The RACH transmitted with the transmission power among P1 to Pn is subjected to distance attenuation and the effect of peripheral-cell interference until the time of reaching the base station, and received in the base station in the range of reception power thresholds Rx1 to Rxn as shown in FIG. 13. The base station compares the reception power value of the received RACH with the aforementioned reception power thresholds Rx1 to Rxn, and estimates the CQI of the mobile station. FIG. 13 shows the case that the RACH is received with the reception power between reception power thresholds Rx2 to Rx3 in frequency region F3. In this case, the base station determines that the CQI of the mobile station is CQI_2.

FIG. 14 is a diagram to explain an example of correspondence between transmission power of the RACH and CQI in the case of transmitting a CQI (more specifically, Downlink CQI) as the information to implicitly notify the base station from the mobile station. In FIG. 14, there are six regions (n=6) as the frequency region, and CQIs are classified into five stages i.e. Very high, High, Medium, Low, and Very Low. The lower number or higher number of classifications is allowed. Further, the CQI to classify may be evenly classed with respect to the range of the CQI, or the range may be varied corresponding to the distribution density of CQI. Furthermore, the range may be varied with each base station.

The mobile station sets the transmission power of the RACH to be included in the range corresponding to the CQI measured immediately before RACH transmission, and transmits the RACH to the base station. In other words, herein, the transmission control information at the time of RACH transmission is set based on the CQI as the state of the mobile station, and the transmission power of the RACH is set as the transmission control information at the time of RACH transmission. In the example as shown in FIG. 14, when the CQI measured immediately before is "High", the mobile station sets transmission power value P meeting P2>P≥P3 as the transmission power, and transmits the RACH to the base station. At this point, the frequency region to use is randomly to selected from F1 to F6.

In addition, the transmission power may be set as the maximum transmission power as shown in FIG. 15, without being set from some range as shown in FIG. 14. In the example as shown in FIG. 15, when the CQI measured immediately is before is High, the mobile station sets transmission power P2 and transmits the RACH to the base station. Further, it is allowed to set power values other than the above-mentioned values, as long as the power values enable the CQI of the mobile station to be determined from the reception power value and do not increase interference to peripheral cells.

The base station receiving the RACH transmitted with the transmission control information thus set compares the reception power of the received RACH with the reception power threshold, and is thereby capable of grasping the CQI of the mobile station. In addition, the above-mentioned reception power thresholds are beforehand defined, or notified from a station higher than the base station. Using the recognized CQI of the mobile station, the base station is capable of suitably determining distribution of radio resources to allocate to the mobile station, modulation scheme to use and the like to perform scheduling.

Particularly, in the example as shown in FIG. 14 or 15, since the RACH is transmitted using the transmission control information with the transmission power of the RACH set based on the CQI at the time of RACH transmission, it is possible to implicitly notify the base station of the CQI at the time of RACH transmission. Therefore, it is possible to increase the information amount notified on the random access channel.

FIG. 16 is a diagram to explain an example of correspondence between transmission power of the RACH and a signature number, and the CQI and RACH transmission reason in the case of transmitting both of the CQI (Downlink CQI) and RACH transmission reason as the information to implicitly notify the base station from the mobile station. In FIG. 16, there are six frequency regions (n=6) as the frequency region, and CQIs are classified into five stages i.e. Very high, High, Medium, Low, and Very Low. The lower number or higher number of classifications is allowed. Further, the CQI to classify may be evenly classed with respect to the range of the CQI, or the range may be varied corresponding to the distribution density of CQI. Furthermore, the range may be varied with each base station.

The mobile station sets the transmission power of the RACH to be included in the range corresponding to the CQI measured immediately before RACH transmission, and selects a signature to form a RACH preamble from the RACH transmission reason. When there is a plurality of corresponding signatures, the mobile station selects one from among the signatures. In other words, herein, the transmission control information at the time of RACH transmission is set based on the CQI and the RACH transmission reason as the state of the mobile station, and further, the transmission power and signature of the RACH is set as the transmission control information at the time of RACH transmission. In addition, the transmission power of the RACH may be set at a unique power value as the maximum transmission power as shown in FIG. 15. Further, it is allowed to set power values other than the above-mentioned values, as long as the power values enable the CQI of the mobile station to be determined from the reception power value and do not increase interference to peripheral cells.

In addition, as a method of transmitting a RACH preamble including the selected signature, considered are a method of transmitting only a RACH preamble, and another method of transmitting a RACH preamble and RACH message at the same time. However, the invention is not affected in the case of using either method, and therefore, both methods are allowed.

The base station receiving the RACH transmitted with the transmission control information thus set compares the reception power of the received RACH with the reception power threshold, and is thereby capable of grasping the CQI of the mobile station. Further, the mobile station is capable of grasping the RACH transmission reason from the signature number. In addition, the above-mentioned reception power thresholds are beforehand defined, or notified from a stat ion higher than the base station. Using the recognized CQI and RACH transmission reason of the mobile station, the base station is capable of suitably determining distribution of radio resources to allocate to the mobile station, modulation scheme to use and the like to perform scheduling.

Particularly, in the example as shown in FIG. 16, since the transmission power is set based on the CQI at the time of RACH transmission, and the signature is set based on the transmission reason of the RACH, it is possible to implicitly notify the base station of the CQI at the time of RACH transmission and the transmission reason of the RACH. Therefore, it is possible to increase the information amount notified on the random access channel.

In FIGS. 14 to 16, CQIs, frequency regions (F1~Fn), signature numbers, corresponding maximum transmission power (P1~Pn), and differences (STEP1~STEPn−1) in maximum transmission power, which are used for RACH transmission, are acquired before RACH transmission by being notified from the base station on the control channel, or by receiving broadcast information. Further, the RACH transmission reason is acquired by a mobile station determining a state of the mobile station. Furthermore, each value as described above is allowed to vary with each base station.

When the CQI is notified with the transmission power of the RACH (FIGS. 14 and 15), in the case where the mobile station cannot receive ACK from the base station in response to RACH transmission, or the mobile station receives NACK, the mobile station randomly selects a signature again, and retransmits a RACH preamble formed of the selected signature with the same transmission power. In this case, the frequency region used in RACH transmission may be the same or different from one another.

When the CQI and RACH transmission reason is notified with the transmission power of the RACH (FIG. 16), in the case where the mobile station cannot receive ACK from the base station in response to RACH transmission, or the mobile station receives NACK, the mobile station randomly selects one from among signatures corresponding to the RACH transmission reason, and retransmits a RACH preamble formed of the selected signature with the same transmission power. In this case, the frequency region used in RACH transmission may be the same or different from one another.

Thus, according to the communication system according to Embodiment 2, since it is possible to implicitly notify the base station of information by the transmission power of the RACH set as the transmission control information, it is possible to increase the information amount notified on the random access channel. Particularly, the number of usable signatures is not significantly limited unlike the conventional way, and it is thereby possible to drastically reduce the collision probability of the RACH.

In addition, the present invention is applicable irrespective of whether uplink synchronization is acquired or not. Further, the subject matter of the invention is not affected even when a part of conditions differs on format used in RACH transmission, coding and modulation method of transmission data, and the other physical layers.

The present invention is not limited to the above-mentioned Embodiments, and is capable of being carried into practice with various modifications thereof. In the above-mentioned Embodiments, sizes, shapes and the like as shown in the accompanying drawings are not limited thereto, and are capable of being modified as appropriate within the scope of exhibiting the effects of the invention. Moreover, the invention is capable of being carried into practice with modifications thereof as appropriate without departing from the scope of the object of the invention.

The invention claimed is:

[1. A mobile communication system comprising:

a mobile station apparatus; and a base station apparatus configured to perform communication with the mobile station apparatus, wherein the mobile station apparatus sets transmission control information for use in transmission of a random access channel, the transmission control information being based on each of:

reception quality measured by the mobile station apparatus, information classified corresponding to a situation in which the mobile station apparatus uses the random access channel, and broadcast information that is beforehand received from the base station apparatus and that indicates a threshold to define a combination of the reception quality and the situation to use the random access channel, and the base station apparatus performs scheduling corresponding to a state of the mobile station apparatus, based on the transmission control information used in transmission of the random access channel from the mobile station apparatus.]

[2. A mobile communication system, comprising:

a mobile station apparatus; and a base station apparatus configured to perform communication with the mobile station apparatus, wherein the mobile station apparatus sets transmission control information for use in transmission of a random access channel, the transmission control information being based on each of:

reception quality measured by the mobile station apparatus, information classified corresponding to a situation in which the mobile station apparatus uses the random access channel, and broadcast information that is beforehand received from the base station apparatus and that indicates a threshold to define a combination of the reception quality and the situation to use the random access channel, and the base station apparatus performs scheduling on radio resources and a modulation scheme to allocate to the mobile station apparatus based on the transmission control information used in transmission of the random access channel from the mobile station apparatus.]

[3. The mobile communication system according to claim 1 or 2, wherein the mobile station apparatus uses a quality information indicator or path loss as the reception quality, and sets, as the transmission control information, one of a transmission frequency region, transmission power and a signature of the random access channel or a combination thereof.]

4. A mobile station apparatus that communicates with a base station apparatus, the mobile station apparatus comprising:

a transmission control information setting device configured to set transmission control information for use in transmission of a random access channel, based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received from the base station apparatus and that indicates a threshold to define a combination of the reception quality and the situation to use the random access channel *in a case where the mobile station apparatus performs the random access upon each of transmission and retransmission*; and a transmitting device configured to transmit the random access channel to the base station apparatus using the transmission control information, *wherein*

*the transmission control information is implicitly informed to the base station apparatus by using a form of second information that implicitly indicates the transmission control information.*

[5. The mobile station apparatus according to claim 4, wherein the transmission control information setting device uses a quality information indicator or path loss as the reception quality, and sets, as the transmission control information, one of a transmission frequency region, transmission power and a signature of the random access channel or a combination thereof.]

6. A base station apparatus that communicates with a mobile station apparatus, the base station *apparatus* comprising:

a receiving device configured to receive a random access channel from the mobile station apparatus, the random access channel *being* transmitted from the mobile station apparatus according to transmission control information set by the mobile station apparatus, the transmission control information being based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received from the base station apparatus and that indicates a threshold to define a combination of the reception quality and the situation to use the random access channel *in a case where the mobile station apparatus performs the random access upon each of transmission and retransmission*; and a scheduling device configured to perform scheduling corresponding to a state of the mobile station apparatus based on the transmission control information used in transmission of the random access channel, *wherein*

*the transmission control information is implicitly informed from the mobile station apparatus by using a form of second information that implicitly indicates the transmission control information.*

7. A base station apparatus that communicates with a mobile station apparatus, the base station *apparatus* comprising:

a receiving device configured to receive a random access channel from the mobile station apparatus, the random access channel *being* transmitted from the mobile station apparatus according to transmission control information set by the [mobiles] *mobile* station apparatus, the transmission control information being based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received from the base station apparatus and that indicates a threshold to define a combination of the reception quality and the situation to use the random access channel *in a case where the mobile station apparatus performs the random access upon each of transmission and retransmission*; and a scheduling device configured to perform scheduling on radio resources and a modulation scheme to allocate to the mobile station apparatus based on the transmission control information used in transmission of the random access channel, *wherein*

*the transmission control information is implicitly informed from the mobile station apparatus by using a form of second information that implicitly indicates the transmission control information.*

[8. The base station apparatus according to claim 6 or 7, wherein the scheduling device performs scheduling based on one of a transmission frequency region, transmission power and a signature of the random access channel of a combination thereof as the transmission control information.]

[9. A mobile communication method in which a mobile station apparatus and a base station apparatus perform communication with each other, the method comprising:

setting, using the mobile station apparatus, transmission control information for use in transmission of a random access channel, based on each of:

reception quality measured by the mobile station apparatus, information classified corresponding to a situation in which the mobile station apparatus uses the random access channel, and broadcast information that is beforehand received from the base station apparatus and that indicates a threshold to define a combination of the reception quality and the situation to use the random access channel, and using the base station apparatus to perform scheduling corresponding to a state of the mobile station apparatus, based on the transmission control information used in transmission of the random access channel.]

[10. A mobile communication method in which a mobile station apparatus and a base station apparatus perform communication with each other, the method comprising:

setting, using the mobile station apparatus, transmission control information for use in transmission of a random access channel, based on each of:

reception quality measured by the mobile station apparatus, information classified corresponding to a situation in which the mobile station apparatus uses the random access channel, and broadcast information that is beforehand received from the base station apparatus and that indicates a threshold to define a combination of the reception quality and the situation to use the random access channel, and using the base station apparatus to perform scheduling on radio resources and a modulation scheme to allocate to the mobile station apparatus based on the transmission control information used in transmission of the random access channel.]

11. A method of transmitting a random access channel from a mobile station apparatus that communicates with a base station apparatus, the method comprising:

setting transmission control information for use in transmission of a random access channel, based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received from the base station apparatus and that indicates a threshold to define a combination of the reception quality and the situation to use the random access channel[,] *in a case where the mobile station apparatus performs the random access upon each of transmission and retransmission;* and transmitting the random access channel to the base station apparatus using the transmission control information, *wherein*

*the transmission control information is implicitly informed to the base station apparatus by using a form of second information that implicitly indicates the transmission control information.*

12. A scheduling method in a base station apparatus that communicates with a mobile station apparatus, the *scheduling* method comprising:

receiving a random access channel from the mobile station apparatus, the random access channel *being* transmitted from the mobile station apparatus using transmission control information set by the mobile station apparatus based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received by the mobile station apparatus from the base station apparatus and that indicates a threshold to define a combination of the reception quality and the situation to use the random access channel[,] *in a case where the mobile station apparatus performs the random access upon each of transmission and retransmission;* and performing scheduling corresponding to a state of the mobile station apparatus based on the transmission control information used in transmission of the random access channel from the mobile station apparatus, *wherein*

*the transmission control information is implicitly informed from the mobile station apparatus by using a form of second information that implicitly indicates the transmission control information.*

13. A scheduling method in a base station apparatus that communicates with a mobile station apparatus, the *scheduling* method comprising:

receiving a random access channel from the mobile station apparatus, the random access channel *being* transmitted from the mobile station apparatus using transmission control information set by the mobile station apparatus based on each of:

reception quality measured by the mobile station apparatus,

*first* information classified corresponding to a situation in which the mobile station apparatus uses the random access channel,

*the first information being used to select, as the transmission control information, one of a transmission frequency resource, transmission power and a signature or a combination thereof,* and broadcast information that is beforehand received by the mobile station apparatus from the base station apparatus and that indicates a threshold to define a combination of the reception quality and the situation to use the random access channel[,] *in a case where the mobile station apparatus performs the random access upon each of transmission and retransmission;* and performing scheduling on radio resources and a modulation scheme to allocate to the mobile station apparatus based on the transmission control information used in transmission of the random access channel from the mobile station apparatus, *wherein*

*the transmission control information is implicitly informed from the mobile station apparatus by using a form of second information that implicitly indicates the transmission control information.*

*14. A mobile station apparatus configured to and/or programmed to communicate with a base station apparatus, the mobile station apparatus comprising:*

*transmitting circuitry configured and/or programmed to:*

*perform a random access to the base station apparatus, the random access being performed according to transmission control information for transmission of a random access channel, and*

*set the transmission control information based on classified information,*

*the classified information being based on a combination of reception quality and a situation of the mobile station apparatus in a case where the mobile station apparatus performs the random access upon each of transmission and retransmission, and*

*the classified information being used to select, as the transmission control information, one of a transmission frequency resource, transmission power and a signature or a combination thereof, wherein*

*the transmission control information is implicitly informed to the base station apparatus by using a form of information that implicitly indicates the transmission control information; and*

*receiving circuitry configured and/or programmed to receive broadcast information including a threshold used for classifying the reception quality.*

*15. A processing method performed in a mobile station apparatus configured to and/or programmed to communicate with a base station apparatus, the processing method comprising:*

*performing a random access to the base station apparatus,*

*the random access being performed according to transmission control information for transmission of a random access channel;*

*setting the transmission control information based on classified information,*

*the classified information being based on a combination of reception quality and a situation of the mobile station apparatus in a case where the mobile station apparatus performs the random access upon each of transmission and retransmission, and*

*the classified information being used to select, as the transmission control information, one of a transmission frequency resource, transmission power and a signature or a combination thereof, wherein the transmission control information is implicitly informed to the base station apparatus by using a form of information that implicitly indicates the transmission control information; and*

*receiving broadcast information including a threshold used for classifying the reception quality.*

*16. A base station apparatus configured to and/or programmed to communicate with a mobile station apparatus, the base station apparatus comprising:*

*detecting circuitry configured and/or programmed to detect a random access performed by the mobile station apparatus,*

*the random access being according to transmission control information for transmission of a random access channel,*

*the transmission control information being based on classified information,*

*the classified information being based on a combination of reception quality and a situation of the mobile station apparatus in a case where the mobile station apparatus performs the random access upon each of transmission and retransmission,*

*the classified information being used to select, as the transmission control information, one of a transmission frequency resource, transmission power and a signature or a combination thereof, wherein the transmission control information is implicitly informed from the mobile station apparatus by using a form of information that implicitly indicates the transmission control information; and*

*transmitting circuitry configured and/or programmed to transmit broadcast information including a threshold used for classifying the reception quality.*

*17. A processing method performed in a base station apparatus configured to and/or programmed to communicate with a mobile station apparatus, the processing method comprising:*

*detecting a random access performed by the mobile station apparatus,*

*the random access being according to transmission control information for transmission of a random access channel,*

*the transmission control information being based on classified information,*

*the classified information being based on a combination of reception quality and a situation of the mobile station apparatus in a case where the mobile station apparatus performs the random access upon each of transmission and retransmission, and*

*the classified information being used to select, as the transmission control information, one of a transmission frequency resource, transmission power and a signature or a combination thereof, wherein the transmission control information is implicitly informed from the mobile station apparatus by using a form of information that implicitly indicates the transmission control information; and*

*transmitting broadcast information including a threshold used for classifying the reception quality.*

* * * * *